(12) United States Patent
Rainer et al.

(10) Patent No.: US 10,797,607 B2
(45) Date of Patent: Oct. 6, 2020

(54) HYBRID SWITCHED-CAPACITOR CONVERTER

(71) Applicant: INFINEON TECHNOLOGIES AUSTRIA AG, Villach (AT)

(72) Inventors: Christian Rainer, Klagenfurt (AT); Roberto Rizzolatti, Villach (AT); Otto Wiedenbauer, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/241,497

(22) Filed: Jan. 7, 2019

(65) Prior Publication Data

US 2020/0220468 A1 Jul. 9, 2020

(51) Int. Cl.
*H02M 3/335* (2006.01)

(52) U.S. Cl.
CPC ... *H02M 3/33592* (2013.01); *H02M 3/33507* (2013.01)

(58) Field of Classification Search
CPC ............. H02M 3/335; H02M 3/33507; H02M 3/33515; H02M 3/33569; H02M 3/33576; H02M 2001/0058
See application file for complete search history.

(56) References Cited

U.S. PATENT DOCUMENTS

| | | | | |
|---|---|---|---|---|
| 4,805,081 A | * | 2/1989 | Chambers | H02M 3/3155 363/96 |
| 6,272,023 B1 | * | 8/2001 | Wittenbreder | H02M 3/33592 363/16 |
| 8,184,456 B1 | * | 5/2012 | Jain | H02M 5/29 363/21.02 |
| 2013/0188400 A1 | * | 7/2013 | Wang | H02M 3/33569 363/21.12 |
| 2017/0353116 A1 | * | 12/2017 | Zhang | H02M 1/08 |
| 2019/0199221 A1 | * | 6/2019 | Zhao | H02M 3/33507 |

FOREIGN PATENT DOCUMENTS

CN 103296882 A 9/2013

OTHER PUBLICATIONS

Zhang Xuan et al: "A GaN transistor based 90W AC/DC adapter with a buck-PFC stage arid an isolated Quasi-switched-capacitor DC/DC stage", 2014 IEEE Applied Power Electronics Conference and Exposition—APEC 2014, IEEE, Mar. 16, 2014, pp. 109-116, XP032590789.
EP Search Report, EP 20150083.2, dated May 20, 2020, pp. 1-7.

* cited by examiner

*Primary Examiner* — Gary L Laxton
(74) *Attorney, Agent, or Firm* — Armis IP Law, LLC

(57) ABSTRACT

A power supply system comprises: a switched-capacitor converter, a transformer, and a voltage converter. The switched-capacitor converter includes multiple capacitors. The multiple capacitors are controllably switched in a circuit path including a primary winding of the transformer to convert the first voltage into a second voltage. The voltage converter converts the first voltage produced by the switched-capacitor converter into the second voltage that powers a load.

28 Claims, 18 Drawing Sheets

HYBRID SWITCHED-CAPACITOR CONVERTER

BACKGROUND

As its name suggests, a conventional switched-capacitor DC-DC converter converts a received DC input voltage into a DC output voltage.

In one conventional application, the input voltage to the conventional switched-capacitor converter falls in a range between 40 VDC to 60 VDC. In such an instance, switches in the switched-capacitor converter are controlled to transfer charge stored in capacitors, resulting in conversion of the input voltage such as a 48 VDC to an output voltage such as 12 VDC for a so-called 4:1 switched-capacitor converter. In other words, a conventional switched-capacitor converter can be configured to convert a 48 VDC voltage into a 12 VDC voltage.

To avoid so-called hard switching in the switched-capacitor converter, the switches in the switched-capacitor converter are preferably switched when there is near zero voltage across them and near zero current flowing through them.

The undesirable hard switching in a conventional switched-capacitor converter may be mitigated by placing an individual inductor in series with a respective capacitor in each stage of the switched-capacitor converter. This results in a resonant (or semi-resonant) switching converter. Such a switched-capacitor converter is sometimes termed a switched tank converter (STC). The resonant tank circuit formed by a series connection of an inductor and capacitor has an associated resonant frequency that is based upon the inductance and capacitance of these components.

Switching of the switches in the conventional switched-capacitor converter at the respective resonant frequency results in so-called zero current switching (ZCS), which reduces switching losses and provides good power conversion efficiency.

BRIEF DESCRIPTION

This disclosure includes the observation that power conversion efficiency of conventional switched-capacitor converters can be improved. For example, to this end, embodiments herein include novel ways of providing improved performance of a switched-capacitor converter and efficient generation of a corresponding output voltage.

More specifically, according to one embodiment, an apparatus (such as a power supply) comprises: a switched-capacitor converter, a transformer, and a voltage converter. The switched-capacitor converter includes multiple capacitors and is operative to produce a first voltage. The transformer includes a primary winding and a secondary winding. A controller of the apparatus controllably switches the multiple capacitors in a respective circuit path including the primary winding to convert the first voltage into a second voltage. A subsequent stage of the power supply such as a voltage converter is coupled to a secondary winding of the transformer and converts the second voltage into an output voltage.

Note that any of one or more of the components of the power supply such as the switched-capacitor converter, transformer, voltage converter, controller, etc., can be implemented as hardware (such as circuitry), software, or a combination of both hardware and software.

In one embodiment, the voltage converter is a rectifier or other suitable converter circuit operative to convert the second input voltage into the output voltage. As previously discussed, the transformer can be configured to include a secondary winding, which is inductively coupled to the primary winding. If desired, the secondary winding can be center tapped to produce the output voltage from the voltage converter.

In accordance with further embodiments, the power supply as described herein includes an inductor connected across nodes of the primary winding of the transformer. The inductor provides zero voltage switching (ZVS) of switches in the switched-capacitor converter. Additionally, or alternatively, note that the zero voltage switching capability can be provided by the magnetizing inductance of the transformer.

In accordance with yet further embodiments, the primary winding of the transformer includes a first node and a second node. The switched-capacitor converter includes a first capacitor (such as a first flying capacitor) and a second capacitor (such as a second flying capacitor). The switched-capacitor converter further includes a first switched circuit path and a second switched circuit path. In one embodiment, the first switched circuit path (including the first capacitor) of the switched-capacitor converter extends (during a first duration of time) from the first node of the primary winding to an input voltage source providing power to the switched-capacitor converter; the second switched circuit path extends (during a second duration of time) from the second node of the primary winding to the input voltage source providing power to the switched-capacitor converter. The first switched circuit path and the second switched circuit path can be activated at different times to produce the voltage inputted to the transformer.

Further embodiments herein include a controller operative to control the switched-capacitor converter and/or the voltage converter.

As a more specific example, the controller is operative to switch the switched-capacitor converter between a first resonant frequency mode and a second resonant frequency mode in which: i) the first resonant frequency mode is operative to charge the first capacitor via an input voltage and discharge the second capacitor through the primary winding, and ii) the second resonant frequency mode is operative to charge the second capacitor via the input voltage and discharge the first capacitor through the primary winding.

In accordance with further embodiments, operation in the first resonant frequency mode includes activation of first switches in the switched-capacitor converter, the activation of the first switches connecting or creating a circuit path including a combination of at least the first capacitor and the primary winding of the transformer in series; operation in the second resonant frequency mode includes activation of second switches in the switched-capacitor converter, the activation of the second switches connecting a combination or creating a circuit path including at least the second capacitor and the primary winding of the transformer in series.

In accordance with still further embodiments, the controller is operative to switch the switched-capacitor converter between operating the switched-capacitor converter at a same resonant frequency during each of multiple different switching modes of controllably switching the multiple capacitors in different circuit paths.

In accordance with still further embodiments, the controller is operative to adjust a frequency of switching different sets of switches such as first switches and second switches in the switched-capacitor converter; adjustment of the frequency controlling a magnitude of the output voltage. To switch between resonant frequency modes, the controller is operative to: i) activate the first switches while the second switches are deactivated, and ii) activate the second switches while the first switches are deactivated. Further embodiments herein include so-called dead times in which not switches are activated.

In a manner as previously discussed, operation in the first resonant frequency mode includes activation of first switches resulting in a unique connection of a combination of the first capacitor, the primary winding of the transformer, and the second capacitor. Operation in the second resonant frequency mode includes a unique connection of a combination of the first capacitor, the primary winding of the transformer, and the second capacitor.

Further embodiments herein implementing the switched-capacitor converter to include a multi-switch circuit coupled to the primary winding of the transformer. Each leg of the multi-switch circuit optionally includes multiple serially connected switches.

In one example embodiment, the switched-capacitor converter includes a first capacitor and a second capacitor coupled to the multi-switch circuit. The apparatus further comprises a controller operative to switch the switched-capacitor converter between a first resonant frequency mode and a second resonant frequency mode in which: i) the first resonant frequency mode is operative to charge the first capacitor via an input voltage and discharge the second capacitor through the primary winding, and ii) the second resonant frequency mode is operative to charge the second capacitor via the input voltage and discharge the first capacitor through the primary winding.

Embodiments herein are useful over conventional techniques. For example, in contrast to conventional techniques, the novel power supply including a switched-capacitor converter, transformer, and voltage converter provide higher efficiency of converting an input voltage to a respective output voltage. Such an embodiment provides improved efficiency (lower loss of energy) of generating a respective output voltage.

These and other more specific embodiments are disclosed in more detail below.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to: controllably switch multiple capacitors in a switched-capacitor converter, the multiple capacitors controllably switched in a circuit path of a primary winding of a transformer, the controlled elective switching of the multiple capacitors converting the first voltage into a second voltage; convert, via the transformer, the first voltage into a second voltage; and control a voltage converter to convert the second voltage produced by the transformer into an output voltage that powers a load.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a switched-capacitor converter, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
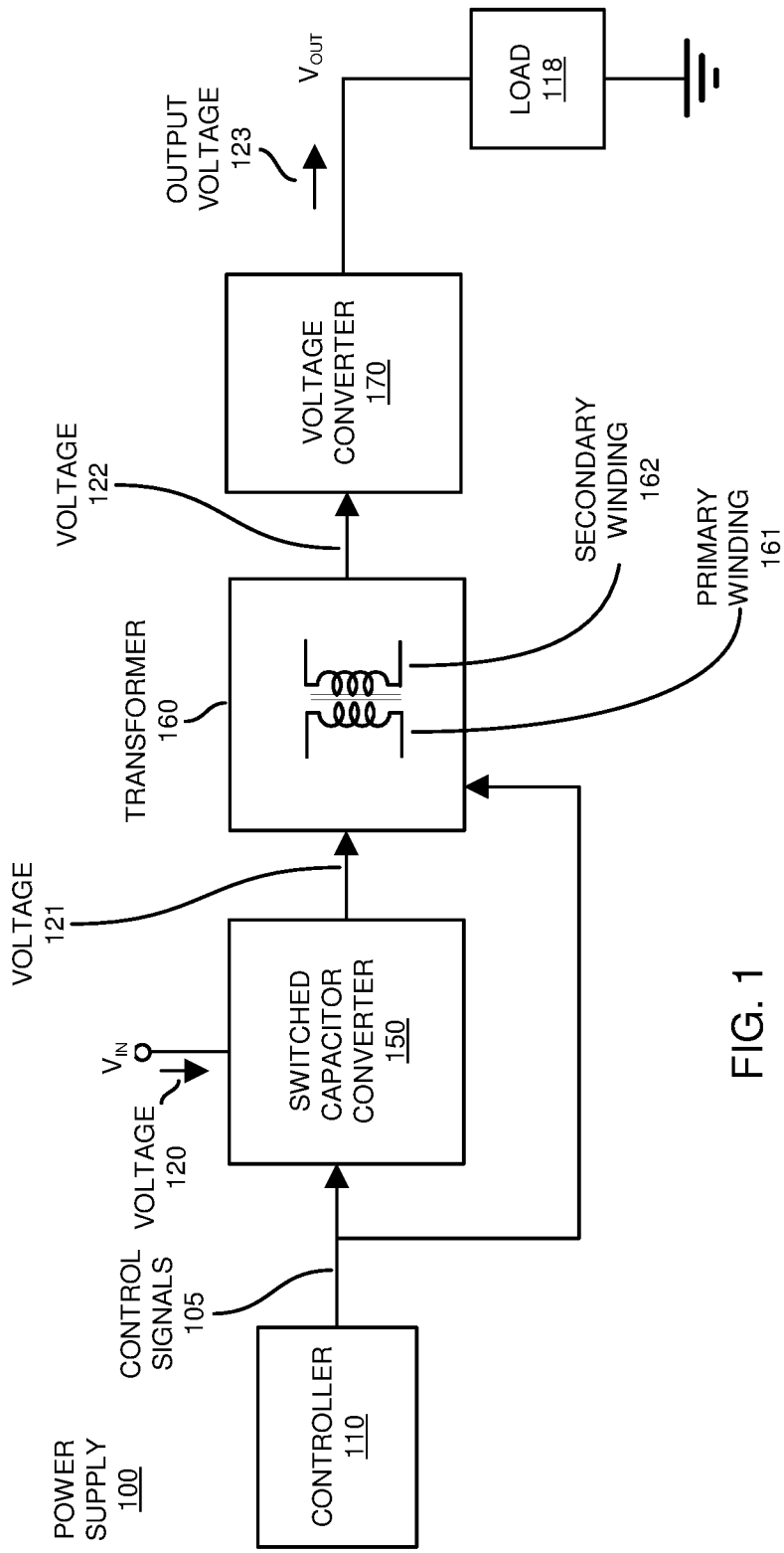
FIG. 1 is an example diagram illustrating a power supply including a switched-capacitor converter according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, as further discussed herein, an apparatus such as a power supply system comprises: a switched-capacitor converter, a transformer, and a voltage converter. The switched-capacitor converter includes multiple capacitors. The multiple capacitors are controllably switched in a circuit path including a primary winding of the transformer to convert the first voltage into a second voltage. The voltage converter converts the first voltage produced by the switched-capacitor converter into the second voltage that powers a load.

The power supply as described herein provides higher efficiency conversion of an input voltage to an output voltage that powers a load.

Now, more specifically, FIG. 1 is an example diagram illustrating a power supply including a switched-capacitor converter according to embodiments herein.

As shown in this example embodiment, power supply 100 (such as an apparatus, electronic device, etc.) includes a controller 110, switched-capacitor converter 150, transformer 160, and voltage converter 170.

Note that each of the resources as described herein can be instantiated in a suitable manner. For example, each of the controller 110, switched-capacitor converter 150, transformer 160, and voltage converter 170, etc., can be instantiated as or include hardware (such as circuitry), software (executed instructions), or a combination of hardware and software resources.

During operation, controller 110 produces control signals 105 (such as one or more pulse width modulation signals) that control states of respective control switches in switched-capacitor converter 150.

As further shown, the switched-capacitor converter 150 receives the input voltage 120 (Vin, such as a DC input voltage) and converts it into first voltage 121. Transformer 160 includes a primary winding 161 and a secondary winding 162. The secondary winding is inductively coupled to the primary winding.

As further discussed herein, controller 140 of the power supply 100 controllably switches multiple capacitors in a respective circuit path including the primary winding 161 of transformer 160 to convert the input voltage into first voltage 121.

Note further that the voltage converter 170 is coupled to secondary winding 162 of the transformer 160 and receives the second voltage 122. The voltage converter 170 converts the second voltage 122 into the output voltage 123 that powers the load 118.

Figure 2:
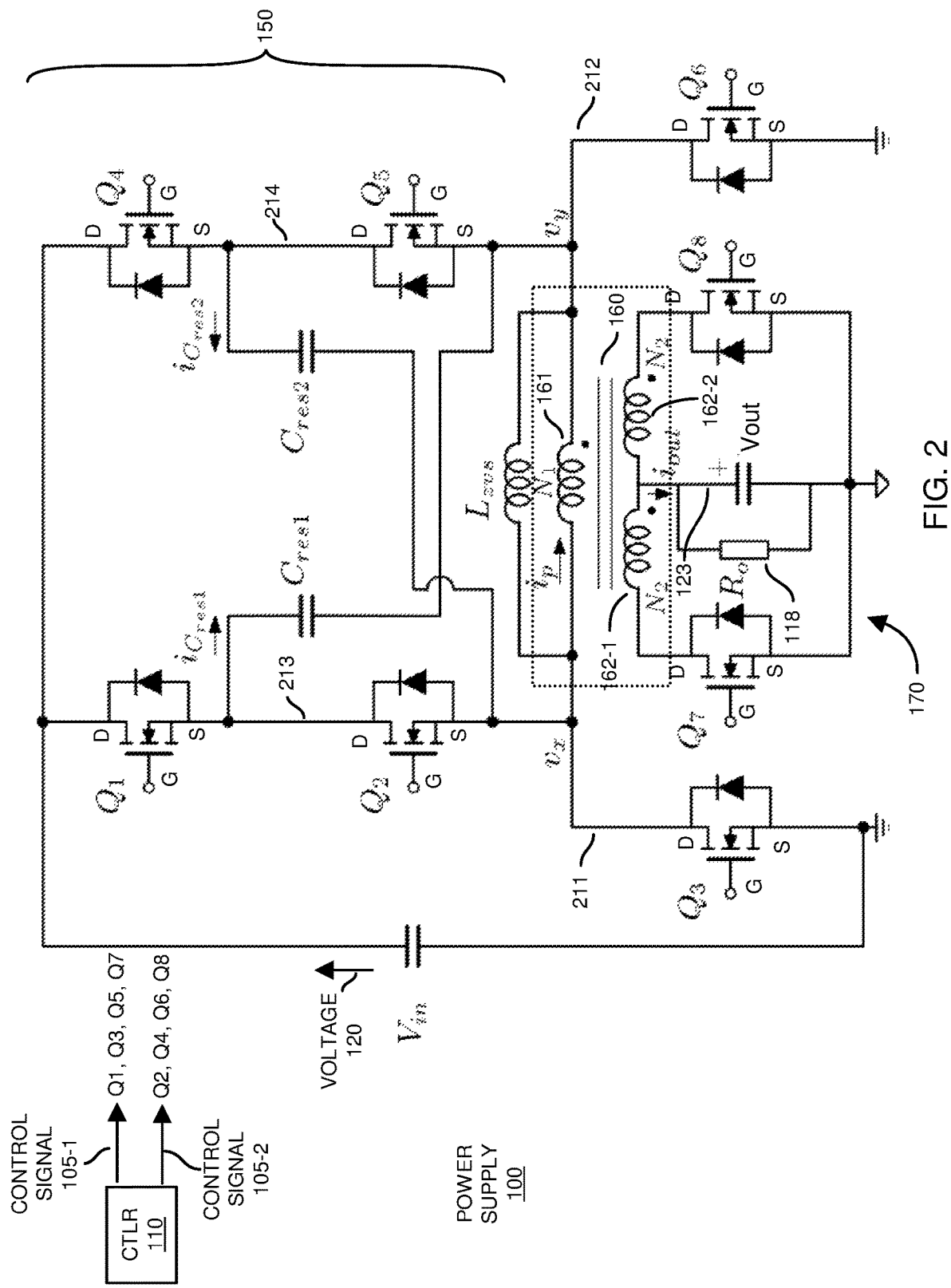
FIG. 2 is an example diagram illustrating a controller and a more detailed rendition of a power supply including a switched-capacitor converter, transformer, and voltage converter according to embodiments herein.

FIG. 2 is an example diagram illustrating a switched-capacitor converter according to embodiments herein.

As shown, the power supply 100 includes voltage source Vin, switched-capacitor converter 150, transformer 160, and voltage converter 170.

The switched-capacitor converter 150 (apparatus such as hardware, circuitry, etc.) includes multiple switches Q1, Q2, Q3, Q4, Q5, and Q6. Additionally, the switched-capacitor converter 150 includes multiple circuit components including inductor Lzvs, capacitor Cres1, and capacitor Cres2.

In this example embodiment, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211. The source node (S) of the switch Q5 is coupled to node 212.

Capacitor Cres1 is connected between node 213 and node 212. Capacitor Cres2 is connected between node 214 and node 211.

Inductor Lzvs is coupled in parallel to primary winding 161 and is disposed between node 211 and 212.

As further shown, the transformer 160 includes primary winding 161 (such as N1 turns) and secondary winding 162.

The number of windings associated with the primary winding 161 and/or the secondary winding 162 can vary depending on the embodiment.

In this example embodiment, secondary winding 162 includes a first secondary winding 162-1 (N2 turns) and a second secondary winding 162-2 (N2 turns). In accordance with further embodiments, note that secondary winding can be a single winding.

As shown, the drain (D) of switch Q3 is connected to node 211; the source (S) of switch Q3 is connected to ground. The drain (D) of switch Q6 is connected to node 212; the source (S) of switch Q6 is connected to ground.

Voltage converter 170 includes switches Q7, and Q8. As further shown, the drain (D) of switch Q7 is connected to the first secondary winding 162-1; the drain (D) of switch Q8 is connected to the second secondary winding 162-2. The center tap of the secondary winding 162 outputs current Iout and produces output voltage 123 to drive load 118.

In one embodiment, the magnitude of the output voltage 123 is Vin/8. Thus, if Vin=48 VDC, the magnitude of the output voltage 123 is 6 volts. However, as discussed herein, settings of components in the power supply 100 can be adjusted to produce an output voltage 123 (Vout) of any suitable value. In general the output voltage 123, Vout=Vin*(N2/(2*N1)), where N1=the number of turns on the primary winding and N2 is the number of turns on each of the secondary windings.

As further shown, during operation, the controller 110 produces control signals 105-1 and 105-2.

In this example embodiment, control signal 105-1 generated by the controller drives gates (G) of respective switches Q1, Q3, Q5, and Q7. Accordingly, control signal 105-1 controls a state of each of the switches Q1, Q3, Q5, and Q7.

Control signal 105-1 drives respective gates (G) of switches Q2, Q4, Q6, and Q8. Accordingly, control signal 105-2 controls a state of each of the switches Q2, Q4, Q6, and Q8.

Note that each of the switches as described herein can be any suitable devices such as (Metal Oxide Semiconductor) field effect transistors, bipolar junction transistors, etc.

Figure 4:
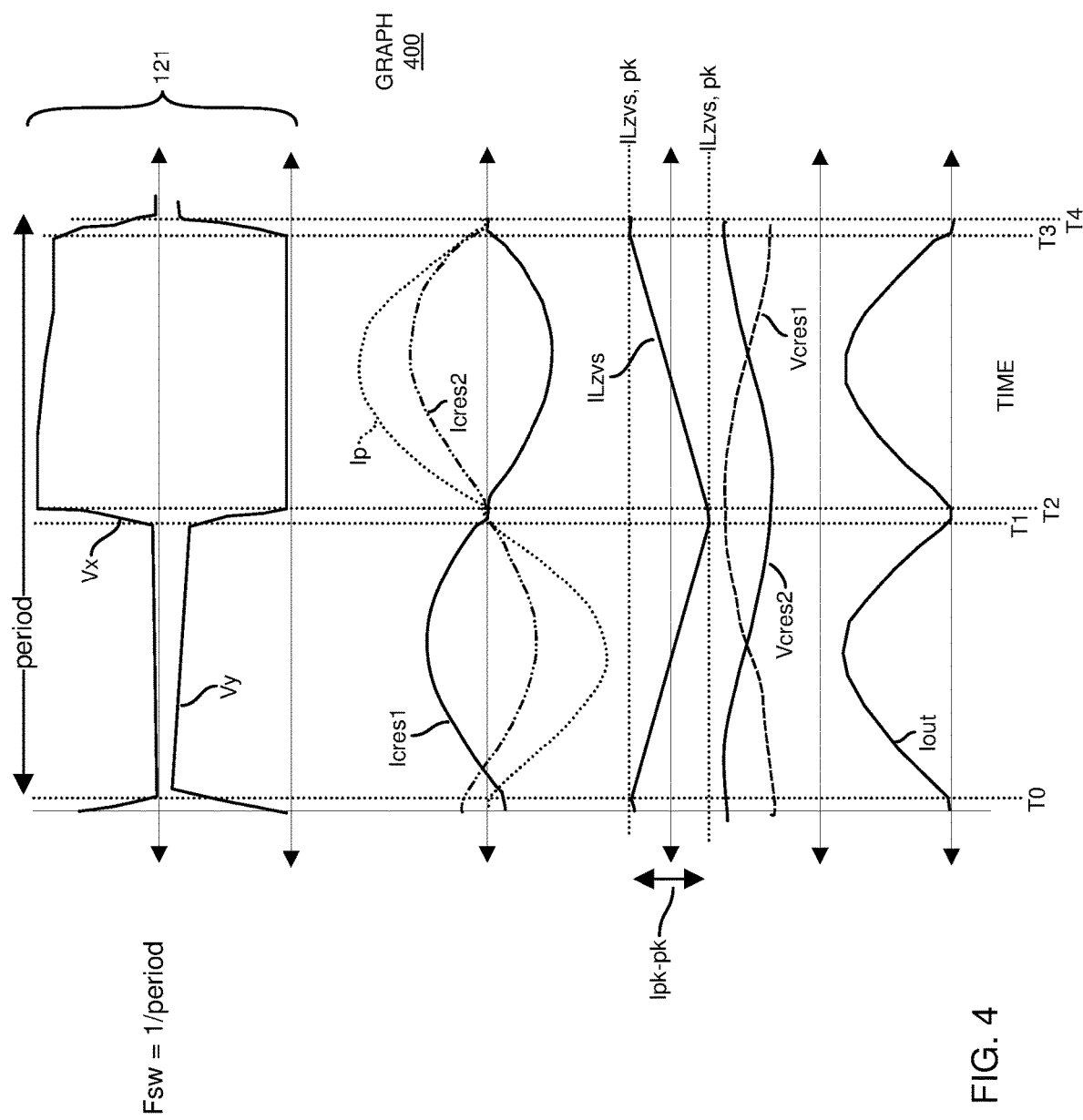
FIG. 4 is an example diagram illustrating a timing diagram of output signals according to embodiments herein.

The settings of capacitors Cres1 and Cres2 can be any suitable value. For example, the voltage converter as described herein provides better performance when Cres1=Cres2, and works well even if Cres1≠Cres2. The inductor Lzvs can be any suitable value. See the discussion below in FIG. 4 illustrating an example setting of inductor Lzvs to provide zero voltage switching to switches in the power supply 100.

Referring again to FIG. 2, in accordance with further embodiments, as shown, the power supply 100 is a switched-capacitor converter (such as Zero Voltage Switching Hybrid Switched Capacitor Converter or ZVS Hybrid-SCC) comprising an interleaved switched-capacitor converter 150 at the primary side and transformer 160 with a center tapped (CT) rectifier at the secondary side (secondary winding and/or voltage converter 170) as shown in FIG. 2.

In one embodiment, additional inductance (such as inductor Lzvs) in parallel with the transformer 160 is optionally present to achieve zero voltage switching (ZVS) for one or more switches Q1-Q8.

If desired, the inductance (inductor) Lzvs is optionally integrated in the primary winding of the transformer 160 to achieve higher power density.

As previously discussed, switches in power supply 100 are divided into two switch groups: the first switch group including switches Q1, Q3, Q5 and Q7 (controlled by control signal 105-1), and a second switch group including switches Q2, Q4, Q6 and Q8, controlled by control signal 105-2, which is generally a 180° phase shift of control signal 105-1.

In one embodiment, the pulse width modulation of control signals 105 is approximately 50% to obtain the minimum RMS current.

The magnitude of the output voltage 123 depends on the turns (# of windings ratio N1/N2 of the primary winding to the secondary winding) and the switching frequency of the control signals 105.

In one embodiment, the controller 110 achieves regulation (such as maintains a magnitude of the output voltage 123 within a desired range) by changing the switching frequency (or period) of controls signals 105. In such an instance, the output voltage 123 can be regulated in opposition to the output current (Iout) variation with a narrow switching frequency variation (i.e. depending on the power capability and the resonant tank components such as capacitors Cres1 and Cres2). According to this, the proposed power supply 100 (such as a ZVS Hybrid-SWITCHED-CAPACITOR CONVERTER) is scalable itself to different conversion ratios by changing only the transformer turns ratio.

Embodiments herein include taking advantage of the leakage inductance, Lk, of the transformer 160 to (soft) charge the capacitors Cres1 and Cres2. For example, in one embodiment, the capacitors Cres1 and Cres2 function as flying capacitors, enabling use of lower voltage field effect transistors at the primary side (switched-capacitor converter 150) in comparison to a classic LLC topology.

In one embodiment, switches Q1, Q3, Q4 and Q6 normally block half of the input voltage Vin/2, switches Q2 and Q5 block all the input voltage, while switches Q7 and Q8 block 2×Vout voltage in their off state.

Note that a further benefit of the switched-capacitor converter 150 as described herein is the symmetric behavior of such a circuit. For example, via the implementation of power supply 100: i) the switched-capacitor converter 150 is powered almost continuously from the input supply Vin, reducing the input current ripple as compared to other technologies, ii) the equivalent resonant tank switched circuit paths of the switched-capacitor converter 150 is the same in both resonant operational modes (such as a first mode between time T0 and time T1 and a second mode between time T2 and time T3 in which both resonant capacitors Cres1 and Cres2 are in parallel). As further discussed herein, this provides a natural balance of regardless the tolerance of the respective circuit components.

Note that one enabler of high efficiency and high-power density of the proposed power supply 100 is the ability to implement lower voltage rating field effect transistors and the implementation of Class II ceramic capacitors (such as capacitors Cres1 and Cres2), which inherently offer high capacitance density.

Moreover, as previously discussed, the additional inductor, Lzvs, provides the inductive energy to ensure ZVS transition for all field effect transistors in the switched-capacitor converter 150 such as during all switching conditions. For example, energy stored in the inductor Lzvs supplies charge to parasitic capacitors of the respective switches.

In one embodiment, to increase output power of the power supply 100, note that additional synchronous rectifier (SR) MOSFETs can be implemented in parallel to reduce the conduction losses at the secondary side of the power supply 100.

Figure 3:
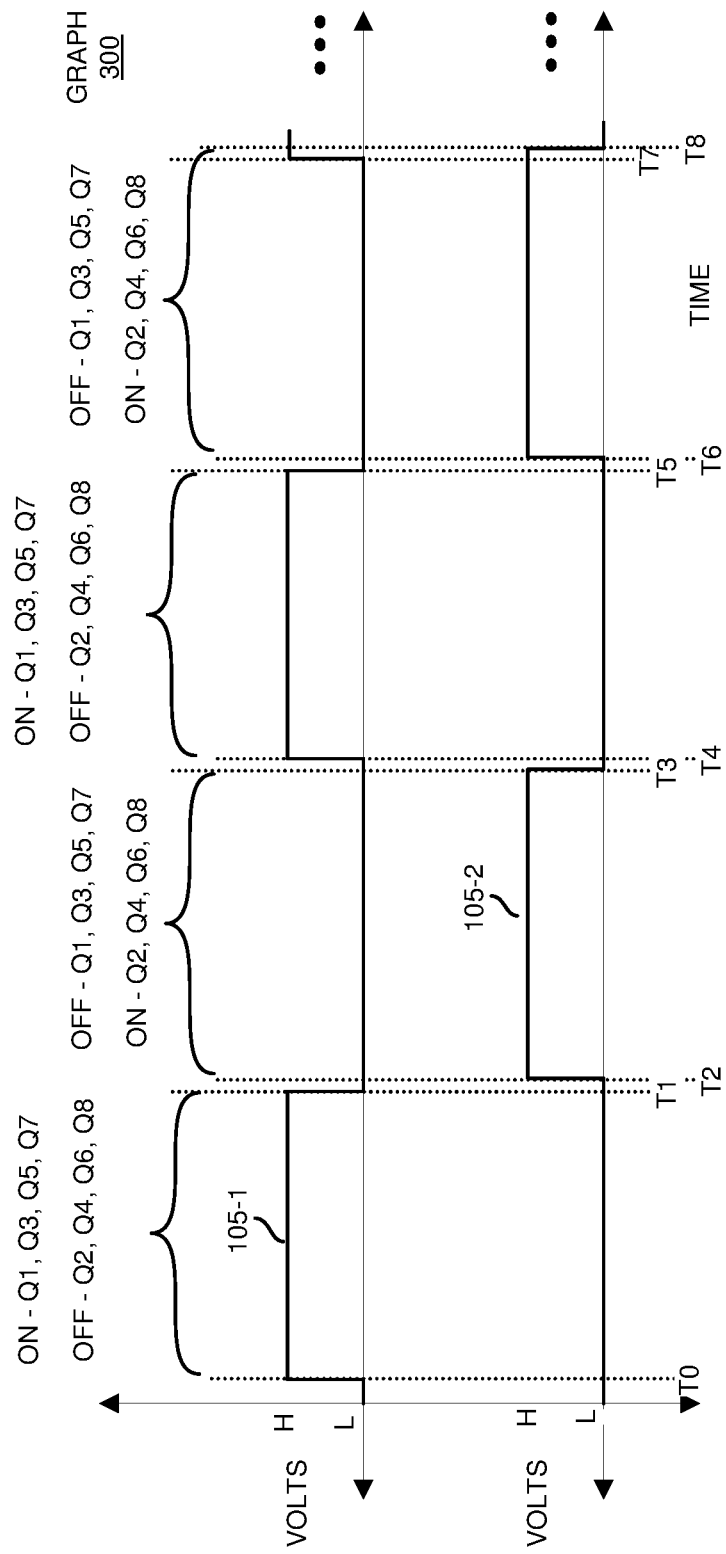
FIG. 3 is an example timing diagram illustrating signals that control switches in a switched-capacitor converter and a voltage converter according to embodiments herein.

FIG. 3 is an example diagram illustrating generation of controls signals to control a switched-capacitor converter and a respective voltage converter according to embodiments herein.

In general, as shown in graph 300, the controller 110 produces the control signal 105-2 to be an inversion of control signal 150-1. A pulse width of each control signal is approximately 49% or other suitable pulse width modulation value.

Between time T0 and time T1, when the control signal 105-1 (at a logic high) controls the set of switches Q1, Q3, Q5 and Q7, to an ON state (low impedance or short circuit), the control signal 105-2 (logic lo) controls the set of switches Q2, Q4, Q6 and Q8, to an OFF state (very high impedance or open circuit).

Conversely, between time T2 and time T3, when the control signal 105-2 (logic high) controls the set of switches Q2, Q4, Q6 and Q8, to an ON state, the control signal 105-1 (logic low) controls the set of switches Q1, Q3, Q5 and Q7, to an OFF state.

Note that the duration between T1 and time T2, duration time between time T3 and time T4, duration between T5 and T6, etc., represents so-called dead times during which each of the switches (Q1-Q8) in the power supply 100 is deactivated to the OFF state (high impedance or open circuit).

As further shown, the control signals 105 are cyclical. For example, the settings of control signals 105 for subsequent cycles is the same as those for the cycle between time T0 and time T4. More specifically, the settings of control signals 105 produced by the controller 110 between time T3 and time T7 is the same as settings of control signals 105 between time T0 and time T3.

In one embodiment, the controller 110 controls the frequency of the control signals (period is time between T0 and time T4) can be generated at any suitable frequency.

Additionally, as previously mentioned, the controller 110 controls the pulse duration of the control signals 105 to be around 49%, although the control signals 105 can be generated at any suitable pulse width modulation value.

In one non-limiting example embodiment, as mentioned, the power supply provides an 8:1 reduction of the input voltage Vin (such as around 48 VDC) to output voltage 123. In such an instance, when the input voltage Vin is 48 VDC, switching of the respective switches converts the 48 VDC input voltage to the output voltage of Vout=6 volts such as an unregulated output voltage. If desired, the output voltage can be regulated to produce the output voltage 123 in a desired range.

As previously discussed, the magnitude of the output voltage 123 (Vout) depends on the turns (# of windings ratio N1/N2 of the primary winding to the secondary winding) and the switching frequency of the control signals 105.

Note that attributes of the switched-capacitor converter 120 can be modified to convert any input voltage level to a respective desired (regulated or unregulated) output voltage level.

FIG. 4 is an example diagram illustrating a timing diagram of output signals according to embodiments herein.

In this example embodiment, the voltage Vx indicates the voltage at node 211 of the primary winding 161; voltage Vy indicates the voltage at node 212 of the primary winding 161.

Icres1 represents current through the capacitor Cres1; Icres2 represents current though capacitor Cres2. Ip represents an amount of current through the primary winding 161, which is equal to Icres2−Icres1.

ILzvs represents current through the inductor Lzvs.
Vcres1 represents the voltage across capacitor Cres1; Vcres2 represents the voltage across capacitor Cres2.
Iout represents the output current supplied by the center tap of secondary winding 162 of the transformer 160 to a load.

Figure 5:
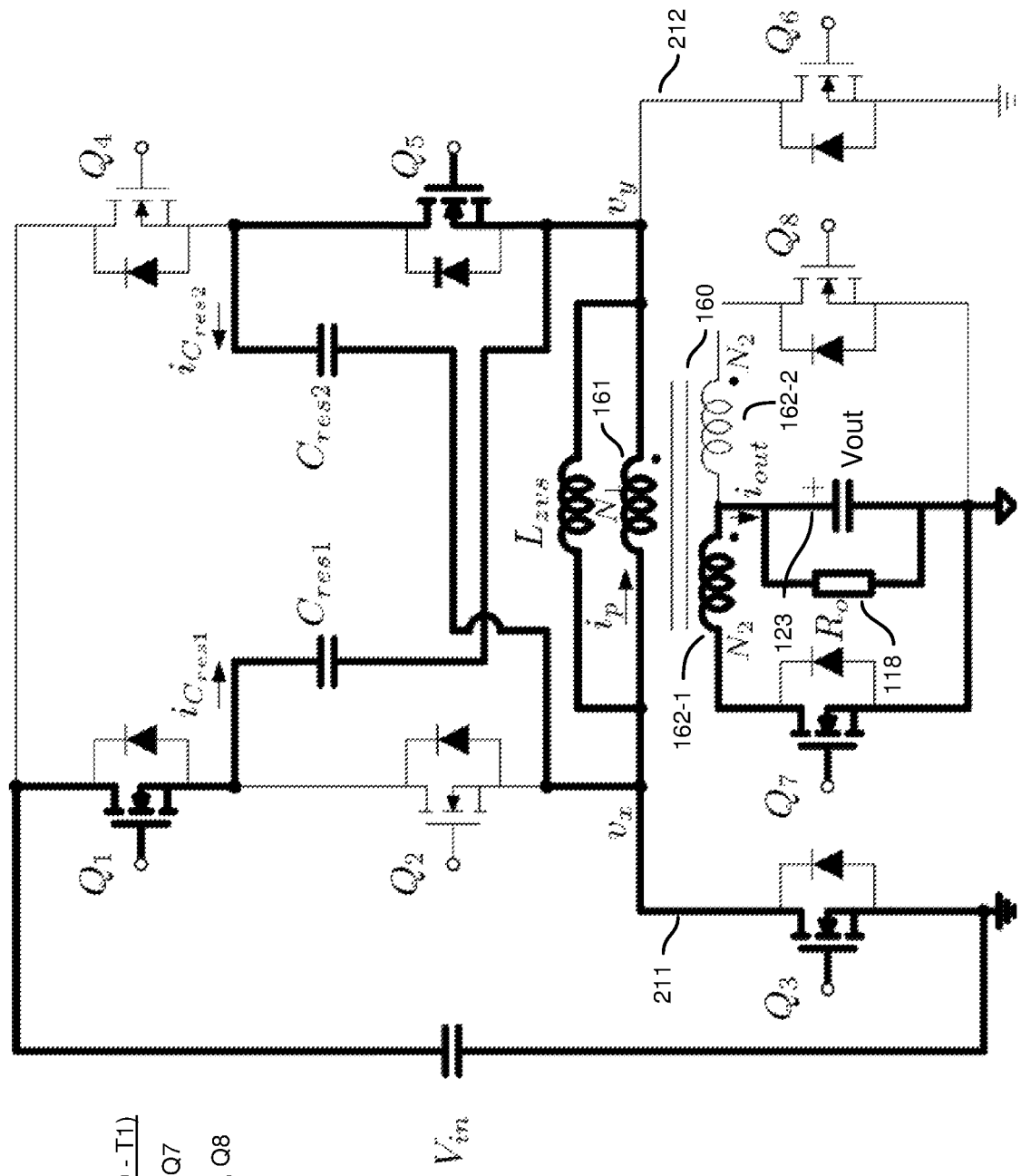
FIG. 5 is an example diagram illustrating a first mode of controlling switches in a switched-capacitor converter and voltage converter according to embodiments herein.

FIG. 5 is an example diagram illustrating a first mode (phase #1) of controlling switches in a switched-capacitor converter and voltage converter according to embodiments herein.

Between time T0 and T1, controller 140 activates (turns ON) switches Q1, Q3, Q5 and Q7.

As previously discussed, the primary winding 161 of the transformer 160 includes a first node 211 and a second node 212. During time T0 to time T1 (a first resonant frequency mode), the controller 110 creates a first switched circuit path connecting the capacitor Cres1 to the input voltage Vin; the controller 110 further creates the first switched circuit path by connecting the capacitor Cres2 to node 212 of the primary winding 160, effectively connecting the capacitors Cres1 and Cres2 in parallel (see FIG. 9 for equivalent circuit).

Zero Voltage Switching (ZVS) and Zero Current Switching (ZCS) and the resonant transition takes place between capacitors Cres1 and Cres2 (effectively in parallel between time T0 and time T1) and the leakage inductance of the transformer (Lk), where the resonant frequency is:

$$f_{res} = \frac{1}{2\pi\sqrt{(C_{res1} + C_{res2})L_k}}$$

Figure 9:
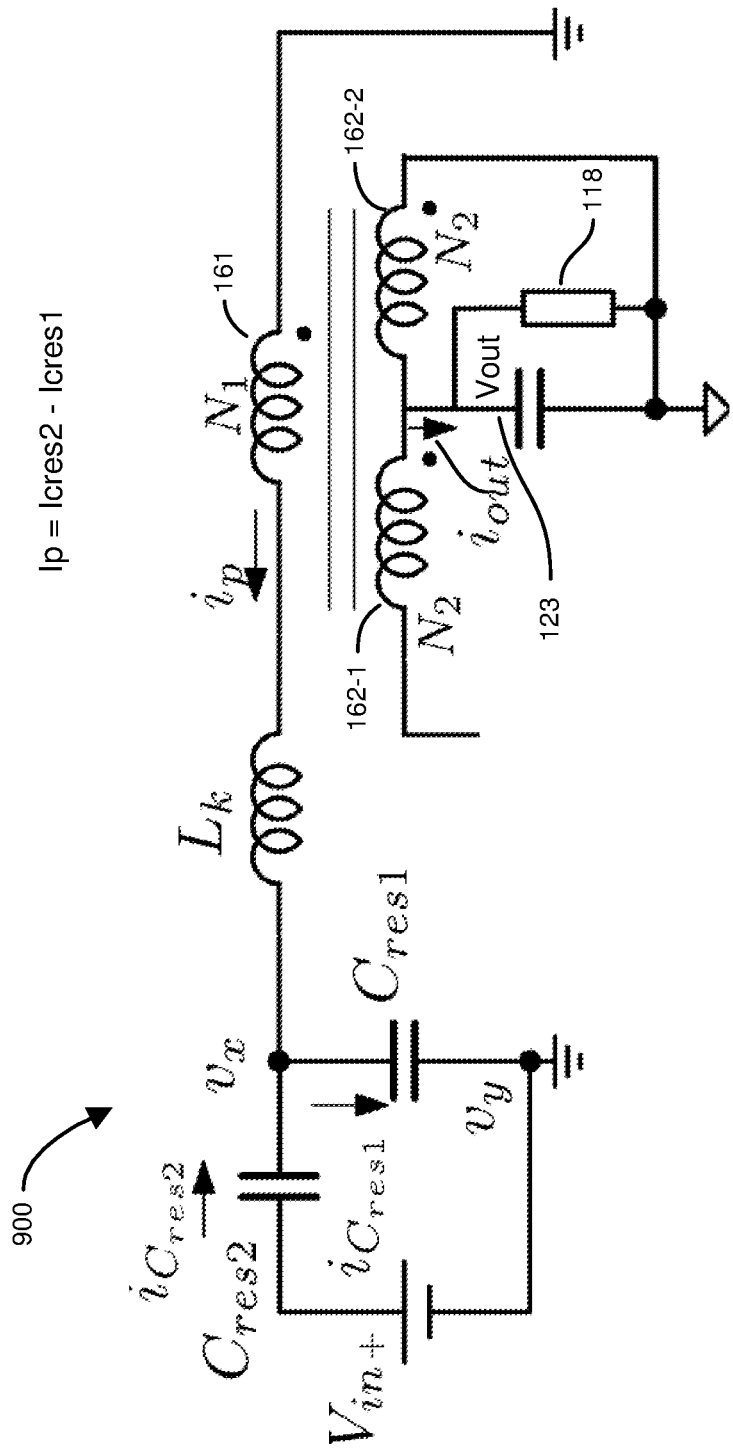
FIG. 9 is an example diagram illustrating a circuit equivalent of the first mode of operation (FIG. 5) according to embodiments herein.

The equivalent resonant tank associated with operation of the switched-capacitor converter 150 as in FIG. 5 is shown in FIG. 9. In this (first or phase #1) mode, first capacitor Cres1 is (soft) charged from the input voltage source Vin, while capacitor Cres2 is (soft) discharged.

Note that when capacitance of Cres1=Cres2, the current through each capacitor is half of the primary current, Ip, of the transformer 160. In other words, as mentioned, current Ip through the primary winding Ip equals current iCres2−iCres1. This is pictorially shown in FIG. 4, where Ip represents an amount of current through the primary winding 161.

Figure 6:
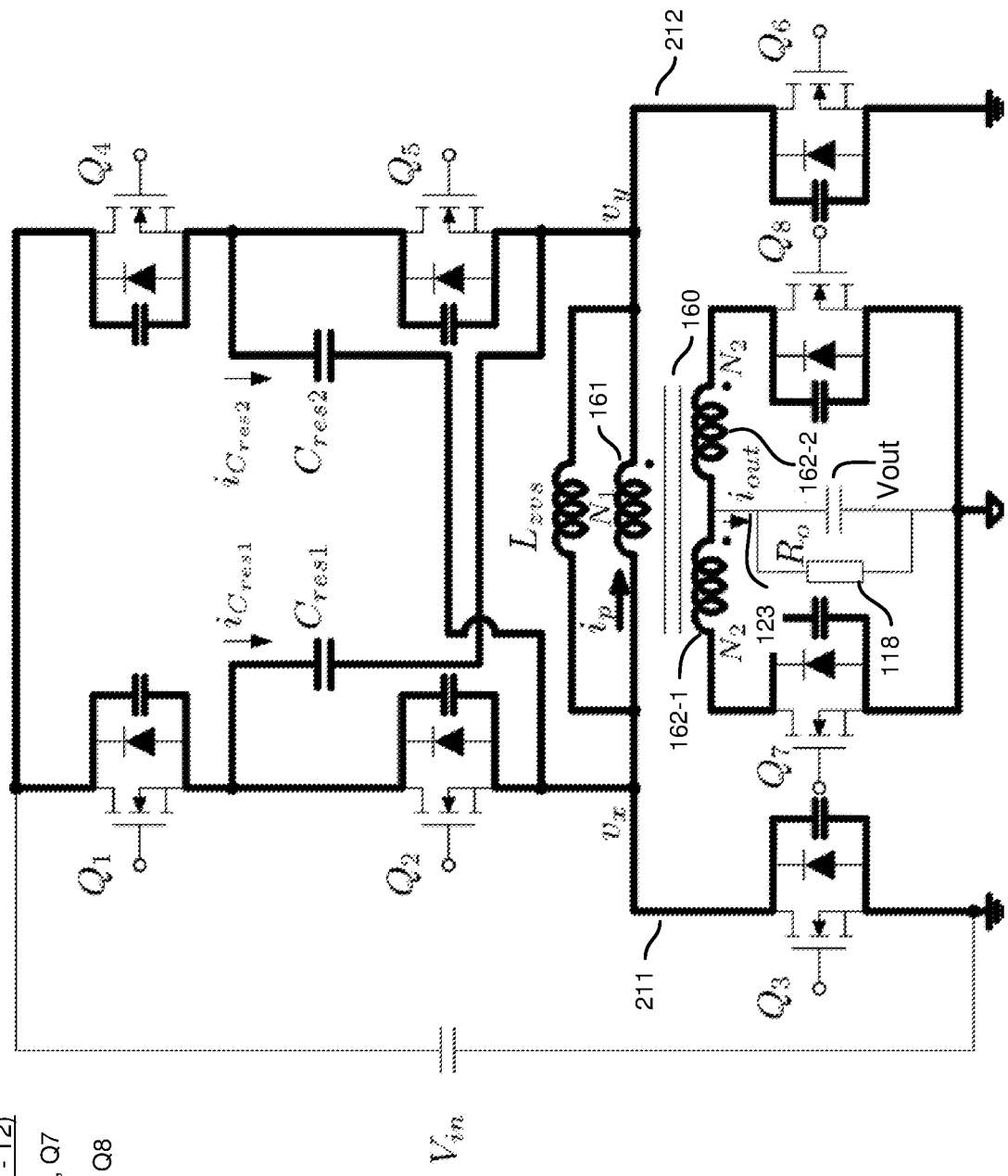
FIG. 6 is an example diagram illustrating a dead time or deactivation of switches in a power supply according to embodiments herein.

FIG. 6 is an example diagram illustrating a dead time or deactivation of all switches in a switched-capacitor converter and voltage converter according to embodiments herein.

Between time T1 and T2, the controller 110 produces the control signal 105-1 to deactivate (turn OFF) switches Q1, Q3, Q5 and Q7; in such an instance, the parasitic capacitance of Q1 and Q3 are each charged to half of the input voltage (Vin/2); the parasitic capacitance of Q5 is charged to the input voltage Vin; the parasitic capacitance of Q7 is charged to 2×Vout; while the parasitic capacitance of Q2, Q4, Q6 and Q8 are each discharged to zero volts using the inductive energy stored in the inductor Lzvs (inductance at time T1).

When the capacitance of Q2, Q4, Q6 and Q8 are discharged to zero, their corresponding body diodes start to conduct to enable ZVS turn on. This is shown in FIG. 6. The current iLzvs at time T1 that enables ZVS operation, is denoted as iLzvs,pk in FIG. 4 which is determined by the following equation:

$$i_{L_{zvs,pk}} = \frac{V_{in}}{8 * L_{zvs} * f_{sw}}$$

Figure 7:
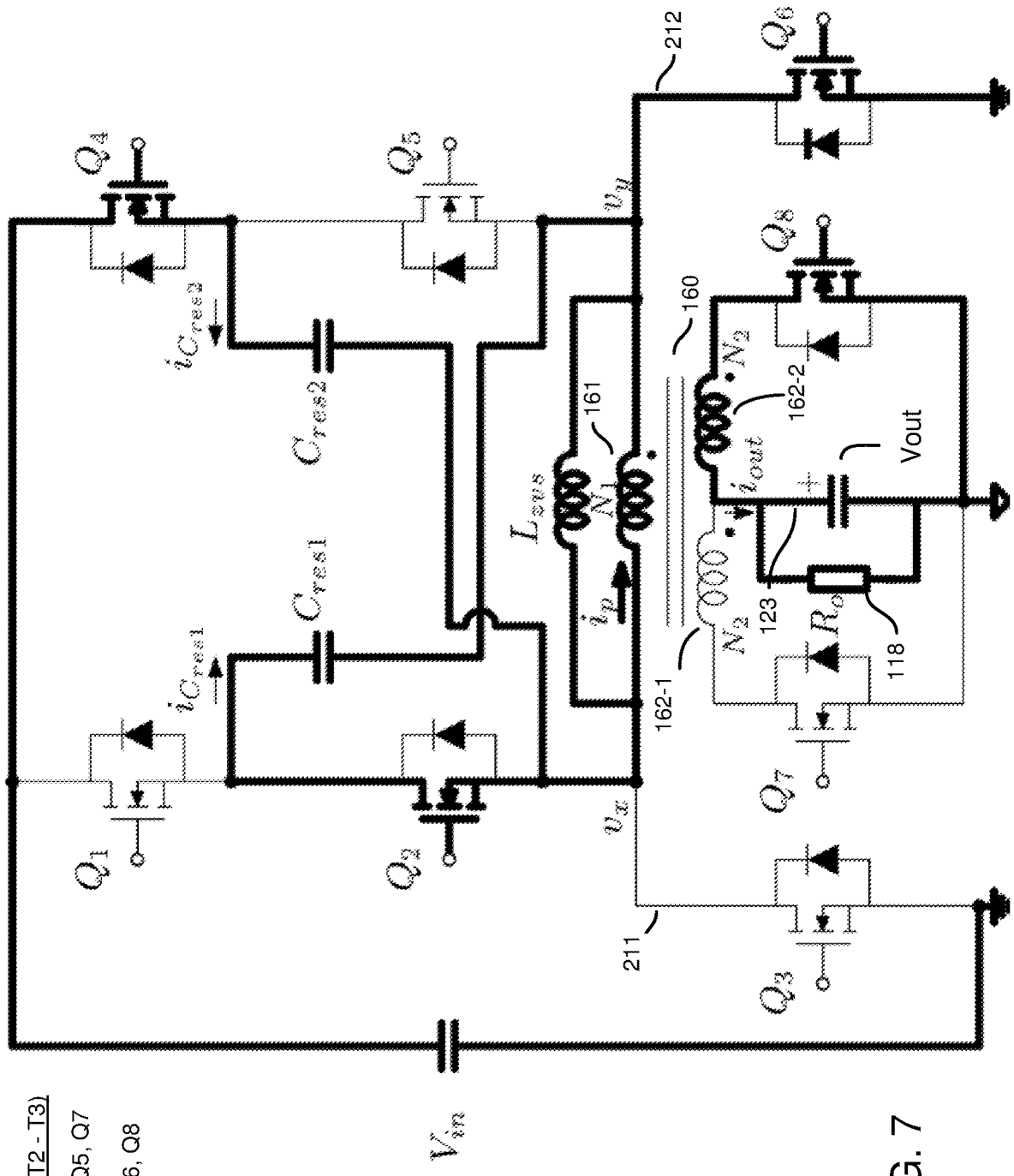
FIG. 7 is an example diagram illustrating a second mode of controlling switches in a switched-capacitor converter and voltage converter according to embodiments herein.

FIG. 7 is an example diagram illustrating a second mode of controlling switches in a switched-capacitor converter and voltage converter according to embodiments herein.

As previously discussed, the primary winding 161 of the transformer 160 includes a first node 211 and a second node 212. During time T2 to time T3 (a second resonant frequency mode), the controller 110 creates a switched circuit path connecting the capacitor Cres2 to the input voltage Vin; the controller 110 further creates the switched circuit path by connecting the capacitor Cres1 to node 211 of the primary winding 160, effectively connecting the capacitors Cres1 and Cres2 in parallel (see FIG. 10 for equivalent circuit).

In one embodiment, the resonant frequency of operating the switched-capacitor converter 150 in the second resonant frequency mode is the same as the resonant frequency of operating the switched-capacitor converter 150 in the first resonant frequency mode.

Zero Voltage Switching (ZVS) and Zero Current Switching (ZCS) and the resonant transition takes place between capacitors Cres1 and Cres2 (effectively in parallel between time T2 and time T3) and the leakage inductance of the transformer (Lk), where the resonant frequency is:

$$f_{res} = \frac{1}{2\pi\sqrt{(C_{res1}+C_{res2})L_k}}$$

Figure 10:
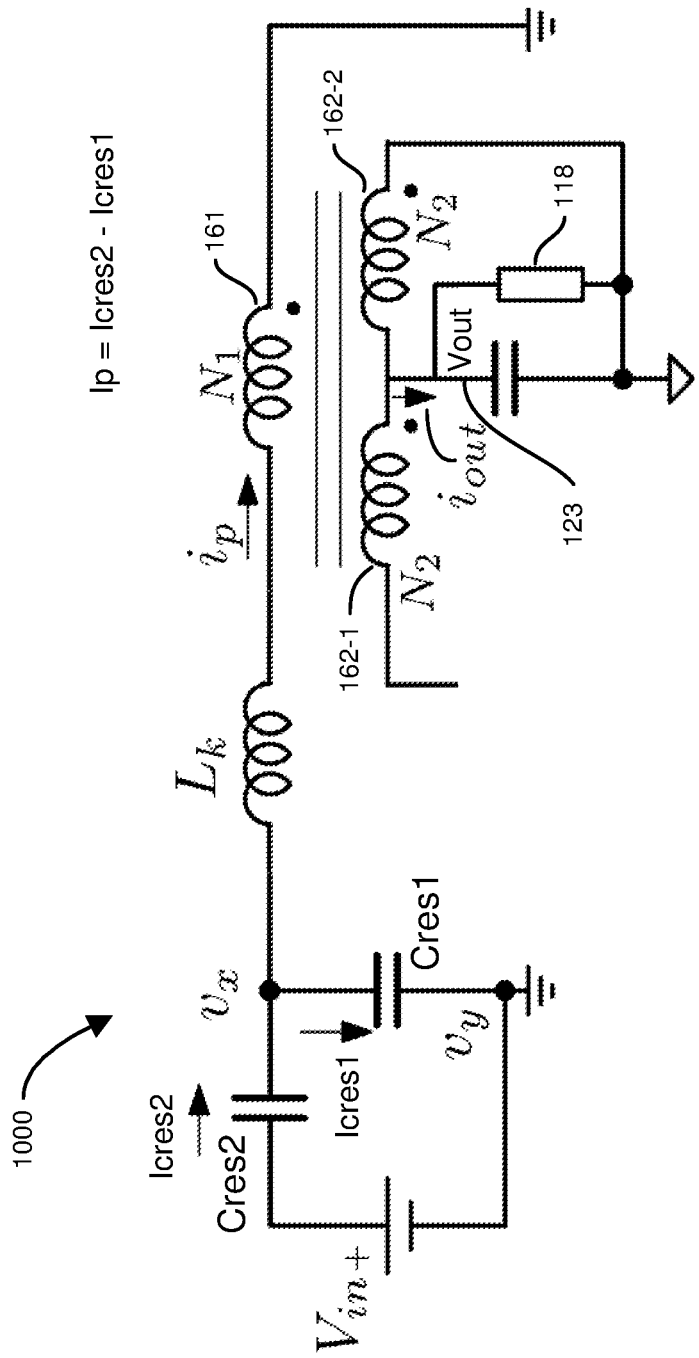
FIG. 10 is an example diagram illustrating a circuit equivalent of the second mode of operation (FIG. 7) according to embodiments herein.

The equivalent resonant tank associated with operation of the switched-capacitor converter 150 as in FIG. 7 is shown in FIG. 10. In this (second or phase #2) mode, second capacitor Cres2 is (soft) charged from the input voltage source Vin, while capacitor Cres1 is (soft) discharged. The resonant frequency of operating in phase #2 is the same as the resonant frequency of operating in phase #1.

Thus, between time T2 and time T3, the controller 110 produces control signal 105-2 to turn ON the switches Q2, Q4, Q6 and Q8 with ZVS. After time T2, the resonant transition takes place between capacitor Cres1 and capacitor Cres2 and the leakage inductance (Lk) of the transformer 160, in an opposite manner as previously discussed, capacitor Cres2 is soft-charged from the input voltage source Vin while capacitor Cres1 is soft-discharged.

Figure 8:
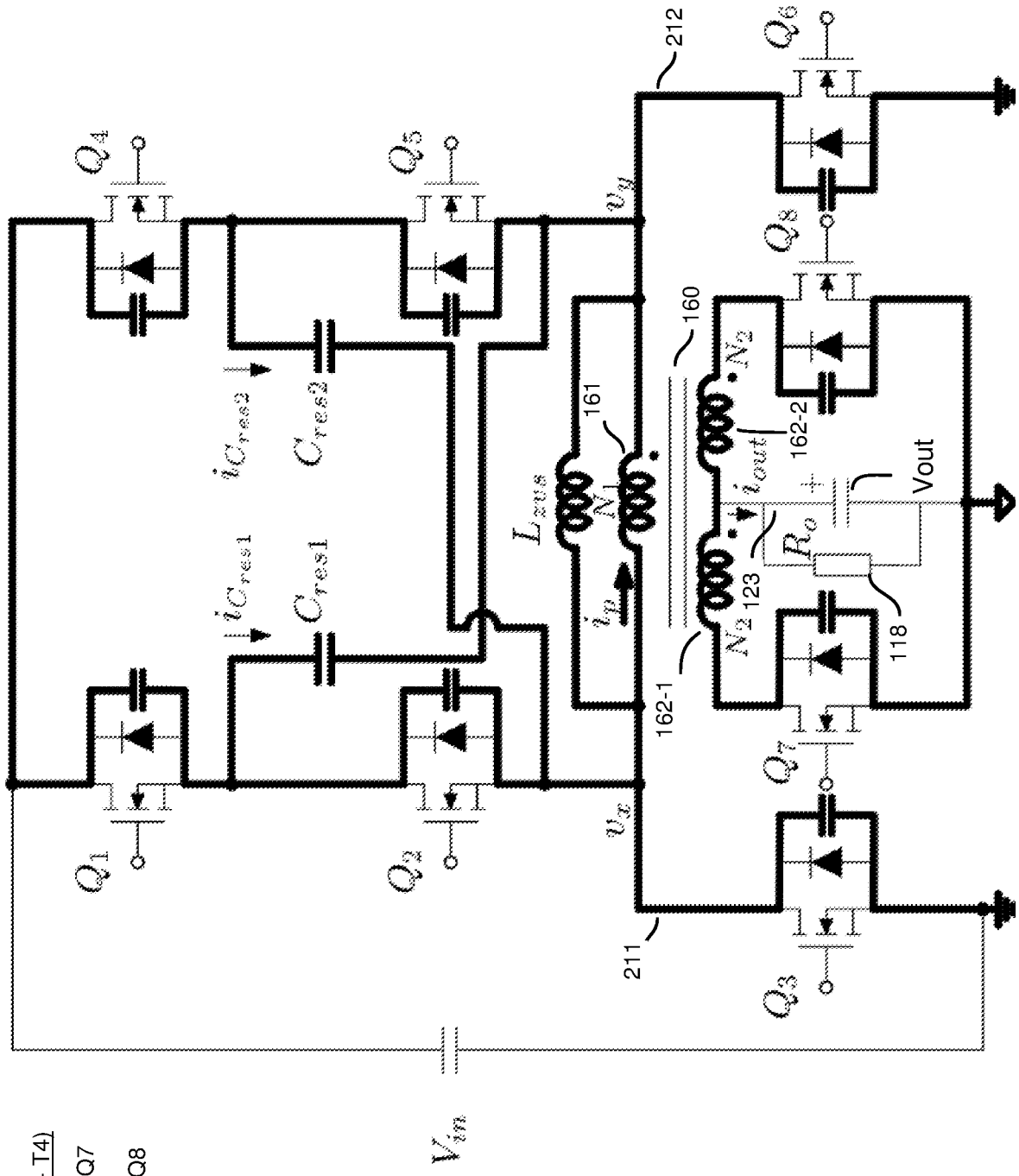
FIG. 8 is an example diagram illustrating a dead time or deactivation of switches in a power supply according to embodiments herein.

FIG. 8 is an example diagram illustrating a dead time or deactivation of all switches in a switched-capacitor converter and voltage converter according to embodiments herein.

Between time T3 and T4, switches Q2, Q4, Q6 and Q8 are turned off and the parasitic capacitance of switches Q4 and Q6 are charged to half of the input voltage Vin/2; switch Q2 is charged at the input voltage Vin; switch Q8 is charged to 2×Vout; while the parasitic capacitance of switches Q1, Q3, Q5 and Q7 are discharged to zero.

When the capacitance of switches Q1, Q3, Q5 and Q7 are discharged to zero, their body diodes start to conduct to enable ZVS turn on. The topological state is shown in FIG. 8. The current that enables ZVS in switched-capacitor converter 150 is i(L_zvs) (T3), which corresponds with $-i$ (L(zvs,pk)). Thus, i(L(zvs,pk)) is a good index to establish when a ZVS condition is achieved for all switches.

At t=T4, switches Q1, Q3, Q5, and Q7 are turned on in ZVS, concluding the switching period (i.e., time T0 to time T4).

As highlighted in the operation of the power supply 100 in different phases (in FIGS. 5-8), the power supply 100 converter achieves ZVS conditions in all load conditions regardless of the tolerance of the components.

In one embodiment, if the expected ZVS condition is designed for the worst case (Vin=V_(in,min) and L_zvs+ tolerance(Lzvs)), the switched-capacitor converter 150 can achieve soft switching operation in all load conditions for different input voltages, which makes the power supply 100 useful in many applications.

FIG. 9 is an example diagram illustrating a circuit equivalent of the first mode (phase #1) of operation (FIG. 5) according to embodiments herein.

In this example embodiment, operation of the power supply 100 as shown in FIG. 5 results in the equivalent circuit 900 in FIG. 9. In such an instance, the capacitor Cres1 is effectively in parallel with the capacitor Cres2. Current Ip=(Icres2−Icres1) through the primary winding 161 is based on a combination of Icres1 and Icres2 as shown in FIG. 4. During phase #1, as shown, and as previously discussed, leakage inductance, Lk, of the primary winding 161 provides (soft) charging of capacitor Cres1 and (soft) discharging of capacitor Cres2.

In one embodiment, the leakage inductance Lk of the transformer 160 represents an additional series inductive impedance of the primary winding 161 of the transformer 160 that does not support conversion of the voltage 121 to voltage 122.

In one example embodiment, Lzvs=1.2 microhenries+/−20%; Fsw=610 KiloHertz. Embodiments herein include ensuring that an amount of energy stored in the resonant inductor (Lzvs) is greater than the energy stored in the MOSFET output capacitors (inherent capacitors across transistors Q1, Q2, Q3, etc., as shown in FIGS. 6 and 8).

$$Ipk\text{-pk} = (VLzvs\_min/Lzvs\_max) \times \text{delta } T =$$
$$(10 \text{ V}/1.44 \text{ microhenries}) \times (1/Fsw) \times 0.5 = 5.69 \text{ Amps}$$

ELzvs=0.5 Lzvs (Ipk−pk/2)$^2$=0.5×1.2 microhenries× (11.66 A)$^2$=5.83 micro Joules; where ELzvs=the energy stored in the inductor Lzvs;

$E_{LZVS}>E_{COSS\_MAX}$, where $E_{COSS\_MAX}$=the energy stored in inherent capacitors of switches;

5.83 microjoules>5.2 microjoules

FIG. 10 is an example diagram illustrating a circuit equivalent of the second mode (phase #3) of operation (FIG. 7) according to embodiments herein.

In this example embodiment, operation of the power supply 100 as shown in FIG. 7 (phase #3) results in the equivalent circuit 1000 in FIG. 10. In such an instance, as shown, the capacitor Cres1 is effectively connected in parallel with the capacitor Cres2. Current Ip=(Icres2−Icres1) through the primary winding 161 is based on a combination of Icres1 and Icres2 as shown in FIG. 4. During phase #3, leakage inductance Lk of the primary winding 161 provides (soft) charging of capacitor Cres2 and (soft) discharging of capacitor Cres1.

Figure 11:
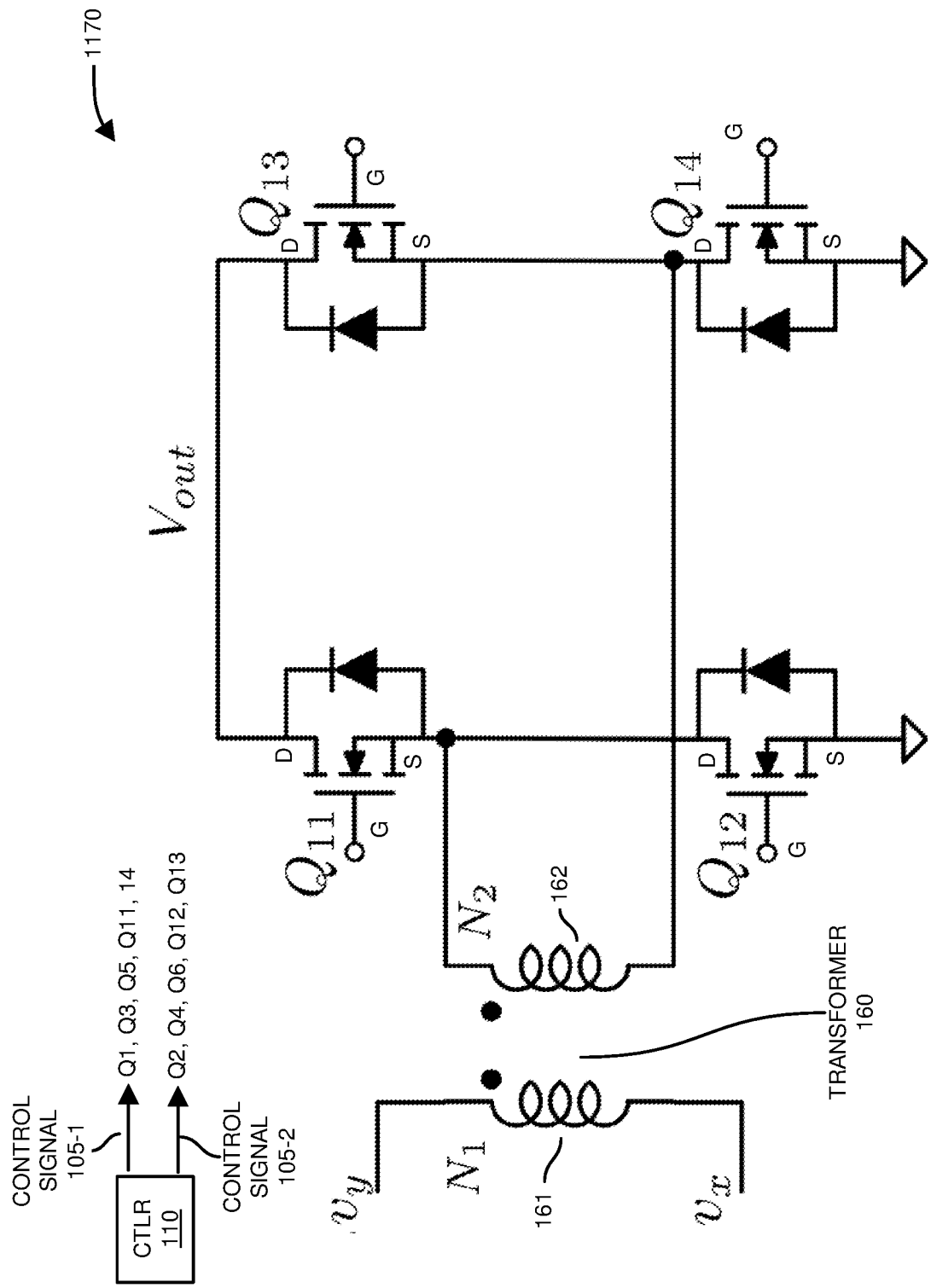
FIG. 11 is an example diagram illustrating implementation of a voltage converter according to embodiments herein.

FIG. 11 is an example diagram illustrating implementation of a voltage converter according to embodiments herein.

Figure 12:
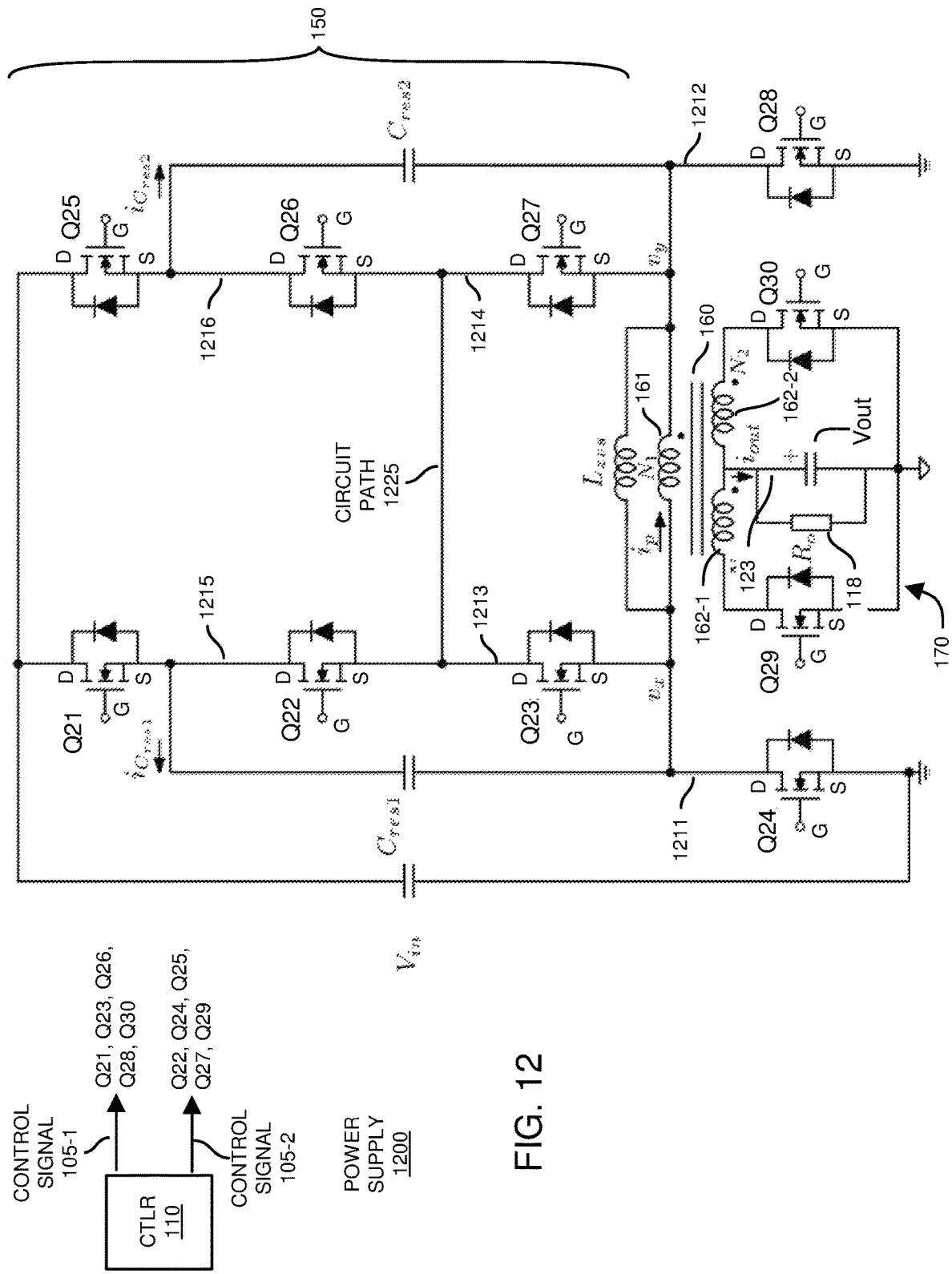
FIG. 12 is an example diagram illustrating an implementation of a switched-capacitor converter including a multi-switch circuit according to embodiments herein.

To further increase the performance of the power supply 100 as described herein, embodiments herein include implementing the voltage converter 170 of the power supply 100 in FIG. 2 and FIG. 12, as a rectifier shown in FIG. 11.

The proposed rectifier 1170 allows use of lower voltage field effect transistors for the switches Q11, Q12, Q13, and Q14. Moreover, the total copper losses at secondary side (secondary windings) of transformer 160 are lower compared with a center-tapped transformer because of the full-bridge rectifier, which implements one secondary winding instead of two windings that are otherwise present if a center-tapped rectifier is used.

Furthermore, in a full-bridge rectification, the secondary side leakage energy is recirculated and not dissipated as in center-tapped rectification.

According to the converter proposed in FIG. 12 (can be also applied to the converter proposed in FIG. 2) switches Q11 and Q14 are controlled by control signal 105-1; switches Q12 and Q13 are controlled by control signal 105-2.

FIG. 12 is an example diagram illustrating an implementation of a switched-capacitor converter including a multi-switch circuit according to embodiments herein.

In this example embodiment, the power supply 1200 includes a switched-capacitor converter 150, transformer 160, and voltage converter 170.

The switched-capacitor converter 150 includes capacitor Cres1, capacitor Cres2, switches Q21, Q22 Q23, Q24, Q25, Q26, Q27, Q28, and inductor Lzvs.

In this example embodiment, referring to switched-capacitor converter 150, the drain node (D) of switch Q21 and the drain node (D) of switch Q25 are connected to the input voltage source Vin.

Further, the source node (S) of the switch Q21 is coupled to the drain node (D) of the switch Q22 and node 1215. The source node (S) of the switch Q25 is coupled to the drain node (D) of the switch Q26 and node 1216.

The source node (S) of the switch Q22 is coupled to the drain node (D) of the switch Q23 and node 1213; the source node (S) of the switch Q26 is coupled to the drain node (D) of the switch Q27 and 1214.

Circuit path 1225 provides coupling between node 1213 and node 1214.

The source node (S) of the switch Q23 is coupled to node 1211. The source node (S) of the switch Q27 is coupled to node 1212.

Capacitor Cres1 is coupled between node 1211 and node 1215. Capacitor Cres2 is coupled between node 1212 and node 1216.

Inductor Lzvs is coupled in parallel to primary winding 161 and is connected between node 1211 and 1212.

As further shown, the transformer 160 includes primary winding 161 (such as N1 turns) and secondary winding 162. In this example embodiment, the secondary winding includes a first secondary winding 162-1 (N2 turns) and a second secondary winding 162-2 (N2 turns). The number of windings can vary depending on the embodiment. In one embodiment, secondary winding 162 is a single winding instead of multiple windings.

As shown, the drain (D) of switch Q24 is connected to node 1211; the source of switch Q24 is connected to ground. The drain (D) of switch Q28 is connected to node 1212; the source of switch Q28 is connected to ground.

Voltage converter 170 in this example embodiment includes switches Q29, and Q30.

The drain (D) of switch Q29 is connected to the first secondary winding 162-1; the drain (D) of switch Q30 is connected to the second secondary winding 162-2. The center tap of the secondary winding 162 produces output voltage 123 to drive load 118.

As further shown, during operation, the controller 110 produces control signals 105-1 and 105-2. In this example embodiment, control signal 105-1 generated by the controller drives gates (G) of respective switches Q21, Q23, Q26, Q28 and Q30. Accordingly, control signal 105-1 controls a state of each of the switches Q21, Q23, Q26, Q28, and Q30.

Control signal 105-2 drives respective gates (G) of switches Q22, Q24, Q25, Q27, and Q29. Accordingly, control signal 105-2 controls a state of each of the switches Q22, Q24, Q25, Q27, and Q29.

The combination of series switches Q22 and Q23 in a first circuit path (first leg), combination of series switches Q26 and Q27 in a second circuit path (second leg), and circuit path 1225 extending between nodes 1213 and 1214 (connecting the first leg and the second leg) represents a multi-switch circuit. As shown, via switches Q23 and Q27, the multi-switch circuit is coupled to nodes 1211 and 1212 across primary winding 161 of transformer 160.

Thus, further embodiments herein implementing the switched-capacitor converter 150 to include a multi-switch circuit of switches coupled to the primary winding 161 of the transformer 160. As further discussed below, the multi-switch circuit (supplemental network of switches including switches Q22, Q23, Q26, Q27, and circuit path 1225) in the switched-capacitor converter 150 provides an alternative way of blocking the input voltage Vin when switches are shut OFF.

As previously discussed, in one example embodiment, the switched-capacitor converter 150 includes a first capacitor, Cres1, connected between nodes 1211 and 1215 and a second capacitor, Cres2, connected between nodes 1212 and 1216. Thus, the capacitors are coupled to the multi-switch circuit.

The apparatus further comprises a controller 110 operative to switch the switched-capacitor converter 150 between a first resonant frequency mode and a second resonant frequency mode in which: i) the first resonant frequency mode is operative to charge the first capacitor Cres1 via an input voltage and discharge the second capacitor Cres2 through the primary winding 161, and ii) the second resonant frequency mode is operative to charge the second capacitor Cres2 via the input voltage and discharge the first capacitor Cres1 through the primary winding.

Embodiments herein are useful over conventional techniques. For example, the novel power supply including a switched-capacitor converter and voltage converter provide higher efficiency of converting an input voltage to a respective output voltage.

Additionally, it is noted that the ZVS Hybrid-SCC (power supply 100) in FIG. 2 does not allow use of low voltage devices (field effect transistors), with superior FOMs (Figure of Merit), since switches Q2 and Q5 in FIG. 2 have to block the full magnitude of the input voltage, Vin.

To overcome this issue, the alternative circuit in FIG. 12 replaces original switches Q2 and Q5 in FIG. 2 with four switches (Q22, Q23, Q26, and Q27 or multi-switch circuit as previously discussed), and connecting capacitor Cres1 and capacitor Cres2, respectively, to node 1211 (Vx) and node 1212 (Vy), in which the switches in the primary side winding in the switched-capacitor converter 150 have to block only half of the magnitude of the input voltage (Vin) in their off state. Thus, all of the switches in power supply 1200 can be fabricated as lower voltage switches.

As previously discussed, all switches of the power supply 1200 in FIG. 12 can be divided into two switch groups: the first switch group is formed by Q21, Q23, Q26, Q28 and Q30 controlled by control signal 105-1, and the second switch group Q22, Q24, Q25, Q27 and Q29) is controlled by control signal 105-2, which is a 180° phase shift PWM signal of control signal 105-1. In one embodiment, the converter 150 of FIG. 12 operates with a fixed duty cycle ideally near 50% to obtain the minimum RMS current.

The power supply 1200 in FIG. 12 is operated in four different phases as shown in FIGS. 13-16.

Figure 13:
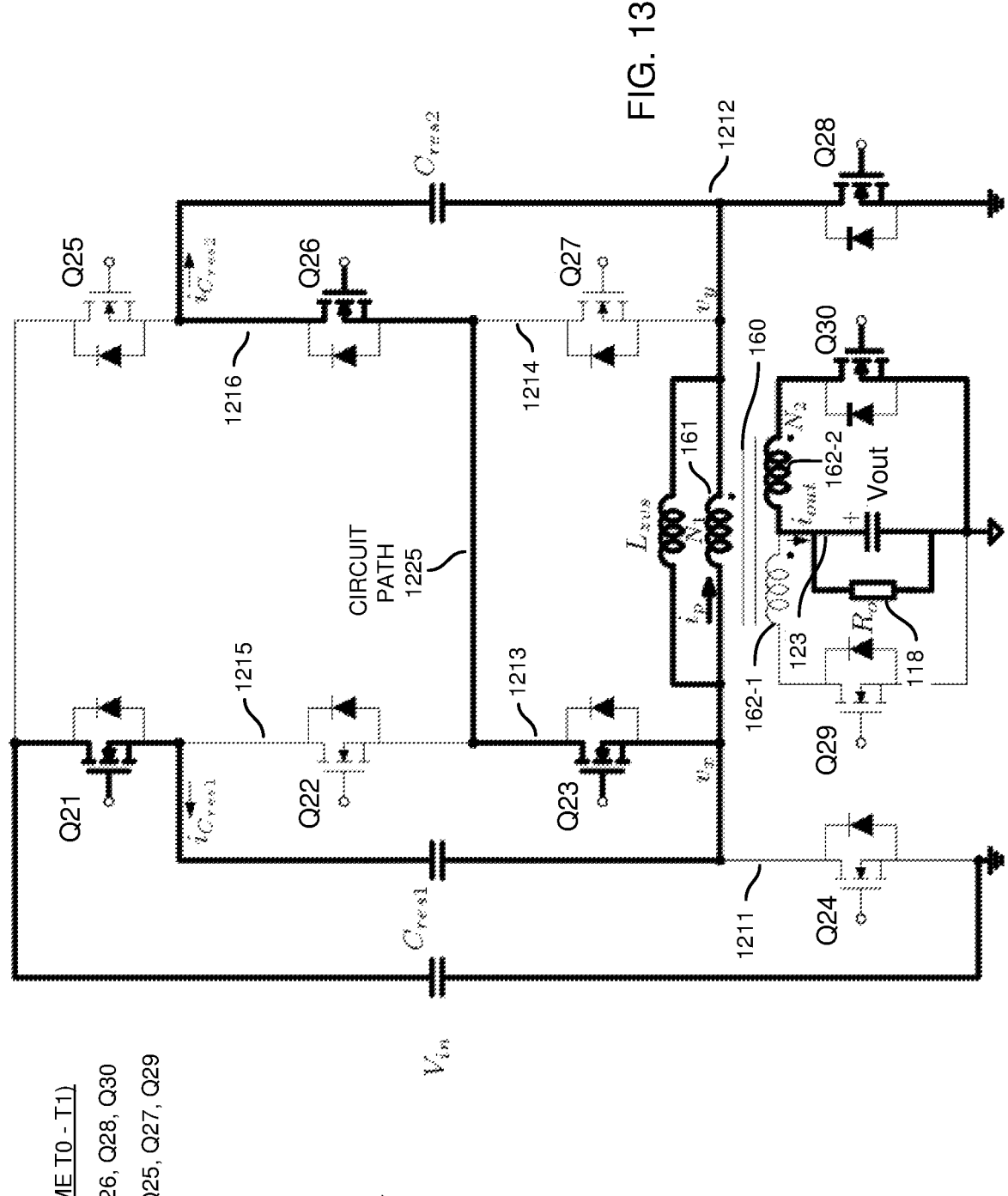
FIG. 13 is an example diagram illustrating a first mode of controlling switches in a switched-capacitor converter and voltage converter according to embodiments herein.

FIG. 13 is an example diagram illustrating a first mode (phase #1) of controlling switches in a switched-capacitor converter and voltage converter according to embodiments herein.

In this example embodiment, between time T0 and T1, switches Q21, Q23, Q26, Q28 and Q30 are turned ON in ZVS and zero current switching (ZCS). The resonant transition takes place between capacitors Cres1, Cres2 and the leakage inductance of the transformer 160, which is labeled Lk.

In a similar manner as previously discussed, in phase #1 associated with FIG. 13, capacitor Cres1 is soft-charged from the input voltage source Vin, while capacitor Cres2 is soft-discharged. When capacitance of capacitor Cres1=Cres2, the current through each resonant capacitor is half of the primary current Ip of the transformer 160.

Figure 14:
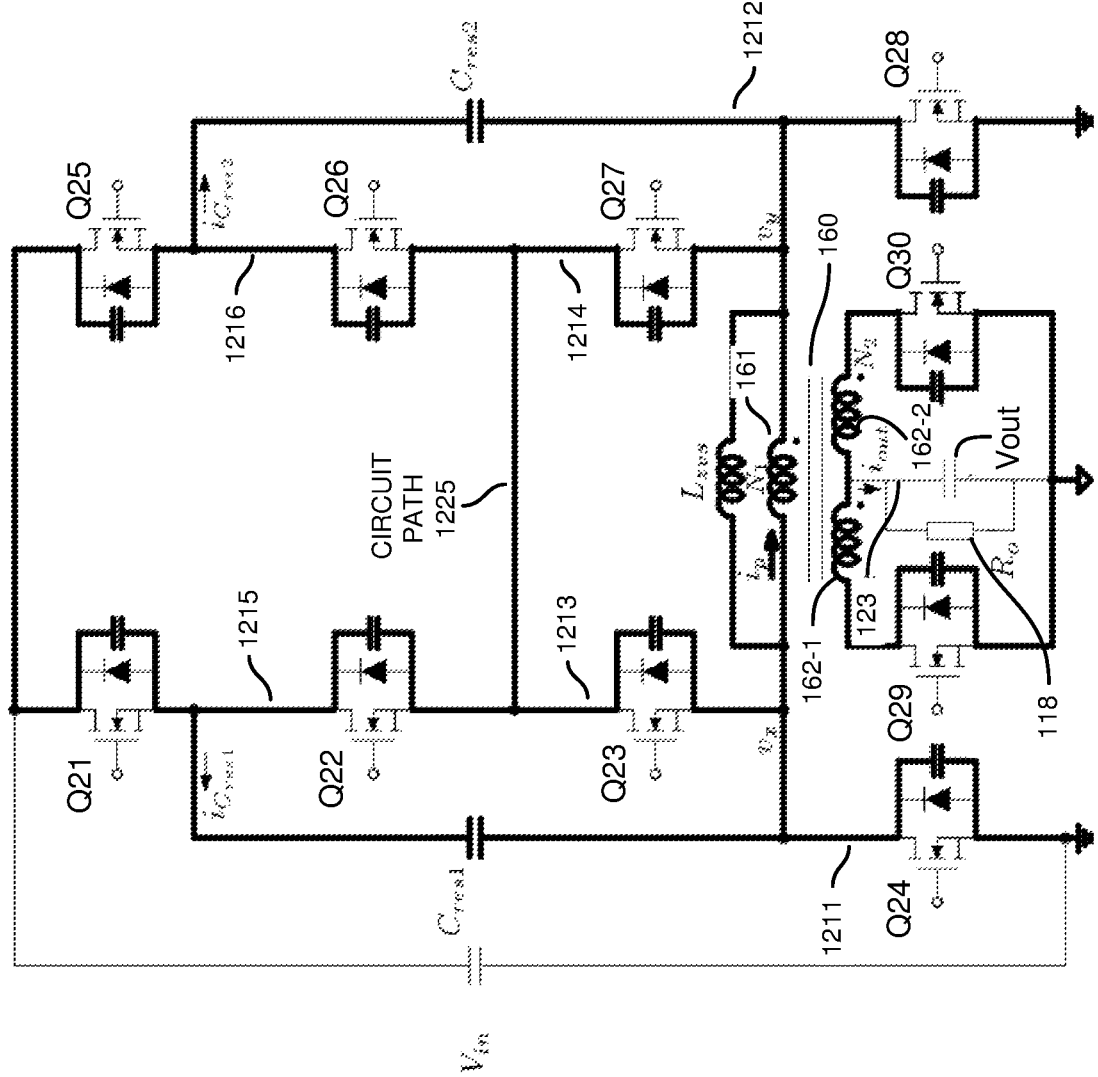
FIG. 14 is an example diagram illustrating a dead time or deactivation of switches in a switched-capacitor converter and voltage converter according to embodiments herein.

FIG. 14 is an example diagram illustrating a dead time or deactivation (phase #2) of all switches in a switched-capacitor converter and voltage converter according to embodiments herein.

Between time T1 and T2, switches Q21, Q23, Q26, Q28 and Q30 are turned OFF and the parasitic capacitance of switches Q21, Q23, Q26, Q28 are charged to half of the input voltage Vin/2; switch Q30 is charged to voltage 2×Vout, while the parasitic capacitance of capacitors Q22, Q24, Q25, Q27, and Q29 are discharged to zero. When the capacitance of capacitors Q22, Q24, Q25, Q27 and Q29 are completely discharged to zero, their body diodes start conducts to enable ZVS turn on. The current i(L_zvs) at time T1 that enable ZVS operation provides the energy to ensure ZVS for all switches.

Figure 15:
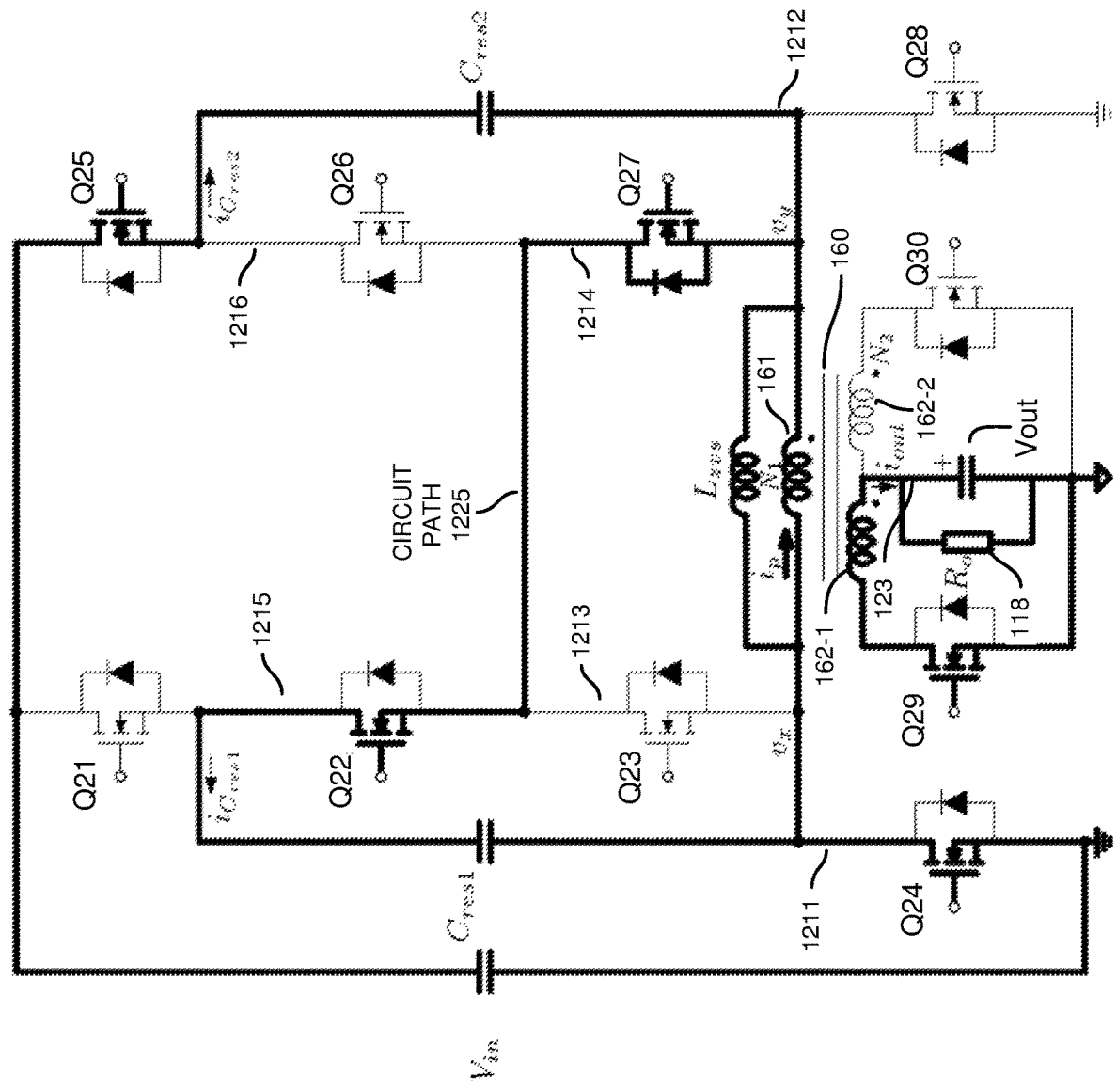
FIG. 15 is an example diagram illustrating a second mode of controlling switches in a switched-capacitor converter and voltage converter according to embodiments herein.

FIG. 15 is an example diagram illustrating a second mode (phase #3) of controlling switches in a switched-capacitor converter and voltage converter according to embodiments herein.

Between time T2 and T3, switches Q22, Q24, Q25, Q27 and Q29 are turned ON with ZVS. After time T2, the resonant transition take place between capacitors Cres1 and Cres2. The leakage inductance, Lk, of the transformer 160 operates in a similar manner as previously discussed, however, in this example embodiment, capacitor Cres2 is soft-charged from the input voltage source Vin while capacitor Cres1 is soft-discharged.

Figure 16:
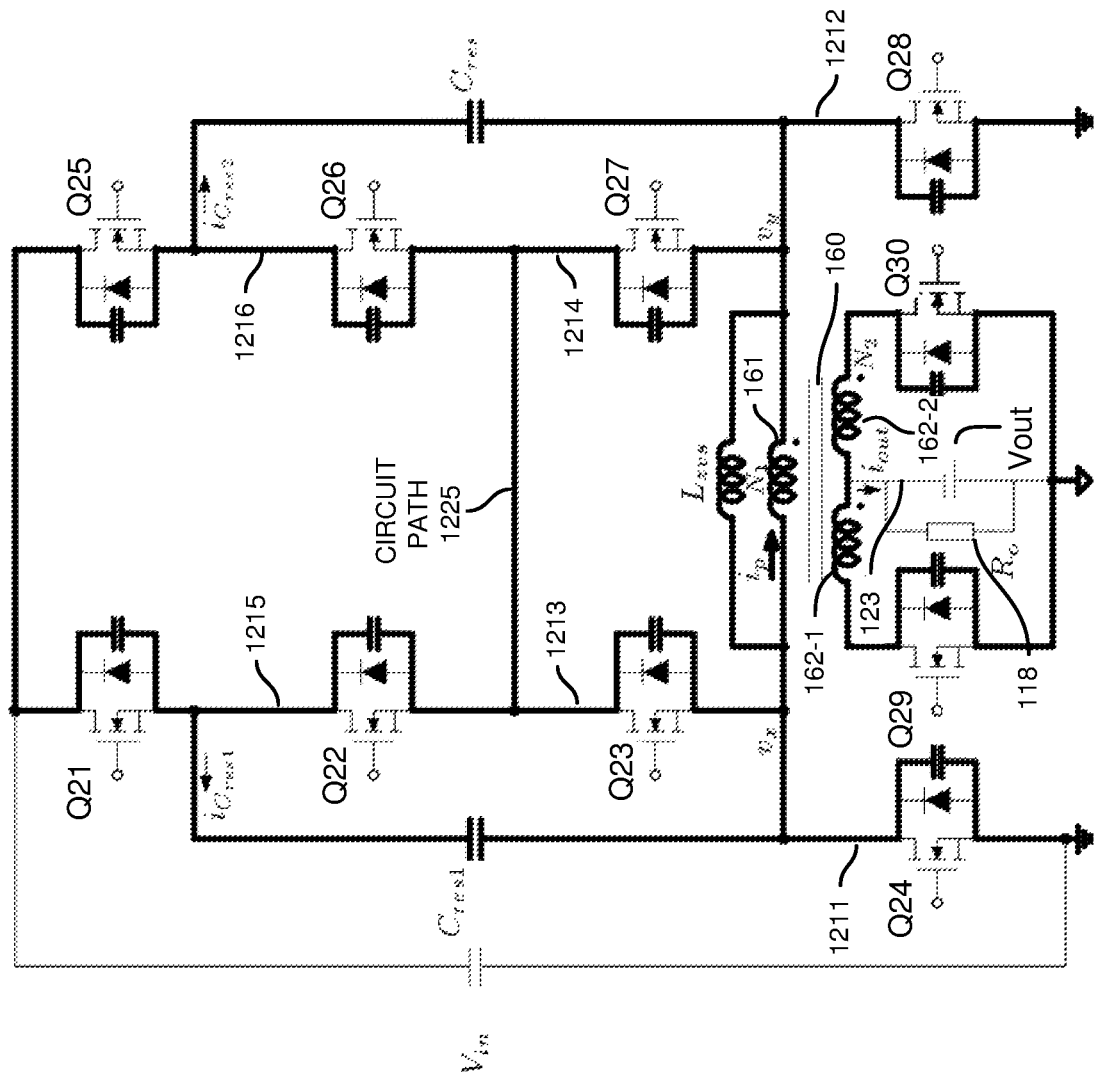
FIG. 16 is an example diagram illustrating a dead time or deactivation of switches in a switched-capacitor converter and voltage converter according to embodiments herein.

FIG. 16 is an example diagram illustrating a dead time or deactivation (phase #4) of all switches in a switched-capacitor converter and voltage converter according to embodiments herein.

Between time T3 and T4, switches Q22, Q24, Q25, Q27 and Q29 are turned OFF and the parasitic capacitance of switches Q21, Q23, Q26, Q28 are charged to half of the input voltage Vin/2; switch Q29 is charged to 2×Vout; while the parasitic capacitance of switches Q21, Q23, Q26, Q28 and Q30 are discharged to zero. When the capacitance of switches Q21, Q23, Q26, Q28 and Q30 are discharged to zero, their body diodes start conducts to enable ZVS turn on. At time T4, switches Q21, Q23, Q26, Q28 and Q30 are turned on in ZVS, which ends the one-cycle switching period Tsw (between time T0 and time T4).

Figure 17:
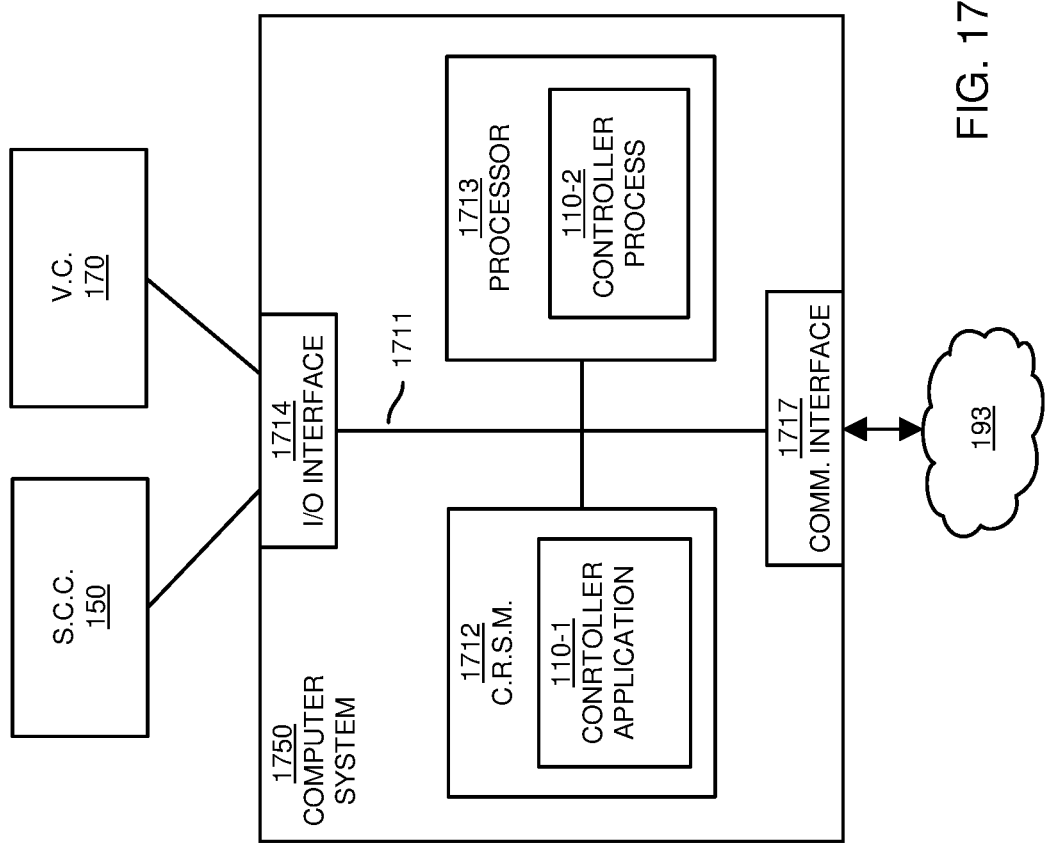
FIG. 17 is an example diagram illustrating computer architecture operable to execute one or more operations according to embodiments herein.

FIG. 17 is an example block diagram of a computer system for implementing any of the operations as previously discussed according to embodiments herein.

Any of the resources (such as controller 110, switched-capacitor converter 150, voltage converter 170, etc.) as discussed herein can be configured to include computer processor hardware and/or corresponding executable instructions to carry out the different operations as discussed herein.

As shown, computer system 1750 of the present example includes an interconnect 1711 that couples computer readable storage media 1712 such as a non-transitory type of media (which can be any suitable type of hardware storage medium in which digital information can be stored and retrieved), a processor 1713 (computer processor hardware), I/O interface 1714, and a communications interface 1717.

I/O interface(s) 1714 supports connectivity to repository 1780 and input resource 1792.

Computer readable storage medium 1712 can be any hardware storage device such as memory, optical storage, hard drive, floppy disk, etc. In one embodiment, the computer readable storage medium 1712 stores instructions and/or data.

As shown, computer readable storage media 1712 can be encoded with controller application 110-1 (e.g., including instructions) to carry out any of the operations as discussed herein.

During operation of one embodiment, processor 1713 accesses computer readable storage media 1712 via the use of interconnect 1711 in order to launch, run, execute, interpret or otherwise perform the instructions in controller application 110-1 stored on computer readable storage medium 1712. Execution of the controller application 110-1 produces controller process 110-2 to carry out any of the operations and/or processes as discussed herein.

Those skilled in the art will understand that the computer system 1750 can include other processes and/or software and hardware components, such as an operating system that controls allocation and use of hardware resources to execute controller application 110-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1750 may reside at any location or can be included in any suitable resource in any network environment to implement functionality as discussed herein.

Functionality supported by the different resources will now be discussed via flowchart in FIG. 18. Note that the steps in the flowcharts below can be executed in any suitable order.

Figure 18:
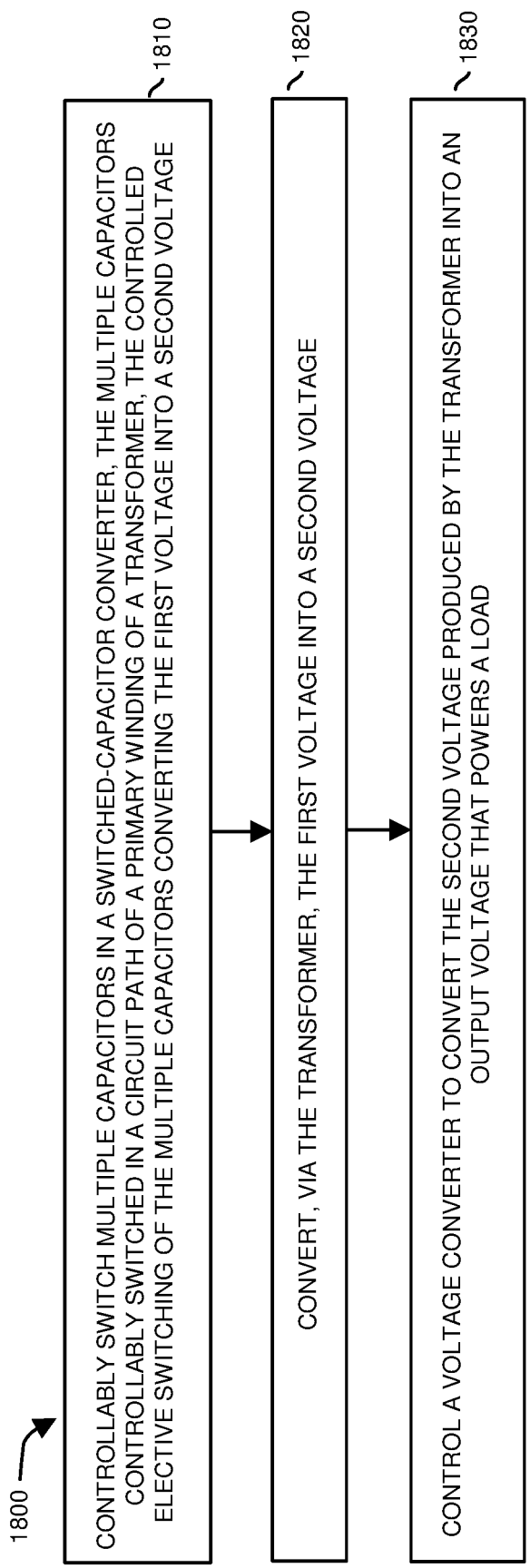
FIG. 18 is an example diagram illustrating a general method according to embodiments herein.

FIG. 18 is a flowchart 1800 illustrating an example method according to embodiments herein. Note that there will be some overlap with respect to concepts as discussed above.

In processing operation 1810, the controller 110 controllably switches multiple capacitors (Cres1 and Cres2) in a switched-capacitor converter 150; the multiple capacitors being controllably switched in a circuit path of a primary winding 161 of the transformer 160; the controlled switching of the multiple capacitors converting the input voltage 120 into a first voltage 121.

In processing operation 1820, the transformer 160 converts the first voltage 121 into a second voltage 122.

In processing operation 1830, via control input from the controller 110, the voltage converter 170 converts the second voltage 122 produced by the transformer into an output voltage 123 that powers a load 118.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a switched-capacitor converter operative to produce a first voltage, the switched-capacitor converter including multiple capacitors, each of the multiple capacitors switched between being coupled to an input voltage and being coupled to a reference voltage;
a transformer including a primary winding, the multiple capacitors controllably switched in a circuit path including the primary winding to convert the first voltage into a second voltage; and
a voltage converter coupled to a secondary winding of the transformer, the voltage converter operative to convert the second voltage into an output voltage;
wherein the multiple capacitors include a first capacitor and a second capacitor;
wherein a combination of the first capacitor, the second capacitor, and the primary winding are coupled in series, the apparatus further comprising:
a controller operative to switch between: i) a first mode in which a node of the first capacitor is coupled to the input voltage while a node of the second capacitor is coupled to the reference voltage, and ii) a second mode in which the node of the first capacitor is coupled to the reference voltage while the node of the second capacitor is coupled to the input voltage.

2. The apparatus as in claim 1, wherein the voltage converter is a rectifier circuit operative to convert the second voltage into the output voltage.

3. The apparatus as in claim 1 further comprising an inductor connected across nodes of the primary winding of the transformer.

4. The apparatus as in claim 3, wherein the inductor is operative to provide zero voltage switching of switches in the switched-capacitor converter.

5. The apparatus as in claim 1, wherein the first capacitor is a first flying capacitor; and
wherein the second capacitor is a second flying capacitor.

6. The apparatus as in claim 1, wherein the
controller is operative to adjust a frequency of switching first switches and second switches in the switched-capacitor converter, adjustment of the frequency controlling a magnitude of the output voltage.

7. The apparatus as in claim 1, wherein the secondary winding is center tapped to produce the output voltage.

8. The apparatus as in claim 1,
wherein the controller is operative to control the switched-capacitor converter and the multiple capacitors in different switching modes during which the switched-capacitor converter operates at a same resonant frequency.

9. The apparatus as in claim 1 further comprising:
an inductor integrated in the transformer, the inductor operative to provide zero voltage switching in the switched-capacitor converter.

10. An apparatus comprising:
a switched-capacitor converter operative to produce a first voltage, the switched-capacitor converter including multiple capacitors;
a transformer including a primary winding, the multiple capacitors controllably switched in a circuit path including the primary winding to convert the first voltage into a second voltage; and
a voltage converter coupled to a secondary winding of the transformer, the voltage converter operative to convert the second voltage into an output voltage;
wherein the multiple capacitors of the switched-capacitor converter include a first capacitor and a second capacitor, the apparatus further comprising:
a controller operative to switch the switched-capacitor converter between a first resonant frequency mode and a second resonant frequency mode in which: i) the first resonant frequency mode is operative to charge the first capacitor via an input voltage and discharge the second capacitor through the primary winding, and ii) the second resonant frequency mode is operative to charge the second capacitor via the input voltage and discharge the first capacitor through the primary winding.

11. The apparatus as in claim 10, wherein operation in the first resonant frequency mode includes activation of first switches in the switched-capacitor converter, the activation of the first switches connecting the first capacitor and the primary winding of the transformer in series; and
wherein operation in the second resonant frequency mode includes activation of second switches in the switched-capacitor converter, the activation of the second switches connecting the second capacitor and the primary winding of the transformer in series.

12. An apparatus comprising:
a switched-capacitor converter operative to produce a first voltage, the switched-capacitor converter including multiple capacitors, each of the multiple capacitors switched between being coupled to an input voltage and being coupled to a reference voltage;
a transformer including a primary winding, the multiple capacitors controllably switched in a circuit path including the primary winding to convert the first voltage into a second voltage; and
a voltage converter coupled to a secondary winding of the transformer, the voltage converter operative to convert the second voltage into an output voltage;
wherein the switched-capacitor converter includes a network of switches coupled to the primary winding of the transformer;
wherein the multiple capacitors of the switched-capacitor converter include a first capacitor and a second capacitor coupled to the network of switches, the apparatus further comprising:
a controller operative to switch the switched-capacitor converter between a first resonant frequency mode and a second resonant frequency mode in which: i) the first resonant frequency mode is operative to charge the first capacitor via the input voltage and discharge the second capacitor through the primary winding, and ii) the second resonant frequency mode is operative to charge the second capacitor via the input voltage and discharge the first capacitor through the primary winding.

13. A method comprising:
controllably switching multiple capacitors in a switched-capacitor converter, each of the multiple capacitors disposed in series with a primary winding of a transformer and switched between being coupled to a first voltage and being coupled to a reference voltage, the controlled switching of the multiple capacitors converting the first voltage into a second voltage;
receiving the second voltage as input to the primary winding of the transformer;
controlling a voltage converter coupled to a secondary winding of the transformer to convert the second voltage into an output voltage that powers a load;
wherein the switched-capacitor converter includes a first capacitor and a second capacitor; and
wherein controllably switching the multiple capacitors in the switched-capacitor converter includes: switching the switched-capacitor converter between a first resonant frequency mode and a second resonant frequency mode in which: i) operation of the switched-capacitor converter in the first resonant frequency mode charges the first capacitor via the first voltage and discharges the second capacitor through the primary winding, and ii) operation in the second resonant frequency mode charges the second capacitor via the first voltage and discharges the first capacitor through the primary winding.

14. The method as in claim 13, wherein controlling the voltage converter includes rectifying the second voltage to produce the output voltage.

15. The method as in claim 13 further comprising:
via an inductor across the primary winding of the transformer, providing zero voltage switching of switches in the switched-capacitor converter used to controllably switch the multiple capacitors in the circuit path.

16. The method as in claim 13 further comprising:
via control of the multiple switches in the switched-capacitor converter:
in a first mode, providing a first switched circuit path extending from a first node of the primary winding to an input voltage source providing power to the switched-capacitor converter, the first switched circuit path including the first capacitor; and
in a second mode, producing a second switched circuit path extending from a second node of the primary winding to the input voltage source providing power to the switched-capacitor converter, the second switched circuit path including the second capacitor.

17. The method as in claim 16, wherein the first capacitor is a first flying capacitor; and
wherein the second capacitor is a second flying capacitor.

18. The method as in claim 13, wherein operation in the first resonant frequency mode includes activating first switches in the switched-capacitor converter; and
wherein operation in the second resonant frequency mode includes activating second switches in the switched-capacitor converter.

19. The method as in claim 13 further comprising:
adjusting a frequency of switching first switches and second switches in the switched-capacitor converter, adjustment of the frequency controlling a magnitude of the second voltage.

20. The method as in claim 13 further comprising:
outputting the output voltage from a center tap of the secondary winding of the transformer.

21. The method as in claim 13 further comprising:
controlling the switched-capacitor converter to operate in different switching modes in which the switched-capacitor converter operates at the same resonant frequency.

22. A method comprising:
controllably switching multiple capacitors in a switched-capacitor converter, each of the multiple capacitors disposed in series with a primary winding of a transformer and switched between being coupled to a first voltage and being coupled to a reference voltage, the controlled switching of the multiple capacitors converting the first voltage into a second voltage;
receiving the second voltage as input to the primary winding of the transformer; and
controlling a voltage converter coupled to a secondary winding of the transformer to convert the second voltage into an output voltage that powers a load;
wherein the switched-capacitor converter includes a multi-switch circuit coupled to the primary winding of the transformer, the method further comprising:
controlling multiple switches in the multi-switch circuit of the switched-capacitor converter to produce the first voltage;
wherein the multiple capacitors include a first capacitor and a second capacitor, the first capacitor and the second capacitor coupled to the multi-switch circuit, the method further comprising:
switching the switched-capacitor converter between a first resonant frequency mode and a second resonant frequency mode in which: i) operation of the switched-capacitor converter in the first resonant frequency mode includes charging the first capacitor via an input voltage and discharging the second capacitor through the primary winding, and ii) operation in the second resonant frequency mode includes charging the second capacitor via the input voltage and discharging the first capacitor through the primary winding.

23. Computer-readable storage hardware having instructions stored thereon, the instructions, when carried out by computer processor hardware, cause the computer processor hardware to:
controllably switch multiple capacitors in a switched-capacitor converter, each of the multiple capacitors disposed in series with a primary winding of a transformer and switched between being coupled to an input voltage and being coupled to a reference voltage, the controlled switching of the multiple capacitors converting the input voltage into a first voltage, the switched-capacitor converter including a first capacitor and a second capacitor;
convert, via the transformer, the first voltage into a second voltage;
control a voltage converter to convert the second voltage produced by the transformer into an output voltage that powers a load; and
wherein the computer processor hardware is further operative to: switch the switched-capacitor converter between a first resonant frequency mode and a second resonant frequency mode in which: i) operation of the switched-capacitor converter in the first resonant frequency mode charges the first capacitor via the input voltage and discharges the second capacitor through the primary winding, and ii) operation in the second resonant frequency mode charges the second capacitor via the input voltage and discharges the first capacitor through the primary winding.

24. An apparatus comprising:
a switched-capacitor converter operative to produce a first voltage, the switched-capacitor converter including multiple capacitors, each of the multiple capacitors switched between being coupled to an input voltage and being coupled to a reference voltage;
a transformer including a primary winding, the multiple capacitors controllably switched in a circuit path including the primary winding to convert the first voltage into a second voltage; and
a voltage converter coupled to a secondary winding of the transformer, the voltage converter operative to convert the second voltage into an output voltage;
wherein the multiple capacitors include a first capacitor and a second capacitor, the apparatus further comprising:
a controller operative to: i) switch between coupling a node of the first capacitor between the input voltage and the reference voltage, and ii) switch between coupling a node of the second capacitor between the reference voltage and the input voltage;
wherein the controller is further operative to, in a first mode: simultaneously couple the node of the first capacitor to the input voltage and the node of the second capacitor to the reference voltage; and
wherein the controller is further operative to, in a second mode: simultaneously couple the node of the first capacitor to the reference voltage and the node of the second capacitor to the input voltage.

25. An apparatus comprising:
a switched-capacitor converter operative to produce a first voltage, the switched-capacitor converter including multiple capacitors, each of the multiple capacitors switched between being coupled to an input voltage and being coupled to a reference voltage;
a transformer including a primary winding, the multiple capacitors controllably switched in a circuit path including the primary winding to convert the first voltage into a second voltage; and
a voltage converter coupled to a secondary winding of the transformer, the voltage converter operative to convert the second voltage into an output voltage;
the apparatus further comprising:
a first circuit path in which a first capacitor of the multiple capacitors is connected in series with the primary winding;
a second circuit path in which a second capacitor of the multiple capacitors is connected in series with the primary winding; and
a controller operative to: i) switch between connecting a node of the first capacitor between the input voltage and the reference voltage; and ii) switch between connecting a node of the second capacitor between the reference voltage and the input voltage.

26. The apparatus as in claim 25, wherein the first circuit path and the second circuit path operate at a same resonant tank frequency.

27. The apparatus as in claim 25 further comprising:
a first switch coupled to a first node of the first circuit path, the first node of the first circuit path residing between the first capacitor and the primary winding; and
a second switch coupled to a first node of the second circuit path, the first node of the second circuit path residing between the second capacitor and the primary winding.

28. The apparatus as in claim 27, wherein the controller is operative to couple, via activation of the first switch ON, the first node of the first circuit path to the reference voltage during a condition in which the second capacitor is coupled to the input voltage; and
wherein the controller is operative to couple, via activation of the second switch ON, the first node of second circuit path to the reference voltage during a condition in which the first capacitor is coupled to the input voltage.

* * * * *